United States Patent
Gernandt et al.

(10) Patent No.: US 8,717,165 B2
(45) Date of Patent: May 6, 2014

(54) APPARATUS AND METHOD FOR LOCATING, TRACKING, CONTROLLING AND RECOGNIZING TAGGED OBJECTS USING RFID TECHNOLOGY

(76) Inventors: Tassilo Gernandt, Korschenbroich (DE); Jamie Robinette, Charlottesville, VA (US)

( * ) Notice: Subject to any disclaimer, the term of this patent is extended or adjusted under 35 U.S.C. 154(b) by 349 days.

(21) Appl. No.: 13/064,378

(22) Filed: Mar. 22, 2011

(65) Prior Publication Data

US 2012/0242481 A1    Sep. 27, 2012

(51) Int. Cl.
G08B 1/08    (2006.01)

(52) U.S. Cl.
USPC ..................................... 340/539.13

(58) Field of Classification Search
USPC ............................ 340/539.13, 568.1, 539.15, 340/572.1–572.9, 10.1; 455/456.1
See application file for complete search history.

(56) References Cited

U.S. PATENT DOCUMENTS

| | | | |
|---|---|---|---|
| 5,032,823 A * | 7/1991 | Bower et al. ............... | 340/572.8 |
| 6,396,438 B1 | 5/2002 | Seal | |
| 6,600,418 B2 | 7/2003 | Sainati et al. | |
| 6,661,335 B1 | 12/2003 | Seal | |
| 6,788,199 B2 * | 9/2004 | Crabtree et al. ......... | 340/539.13 |
| 7,242,293 B2 | 7/2007 | Rea et al. | |
| 7,274,292 B2 * | 9/2007 | Velhal et al. ............. | 340/539.32 |
| 7,405,663 B2 | 7/2008 | Lieffort et al. | |
| 7,898,414 B2 * | 3/2011 | Spano ........................... | 340/571 |
| 7,994,918 B2 * | 8/2011 | Lai et al. .................... | 340/572.1 |
| 2004/0217859 A1 * | 11/2004 | Pucci et al. ............. | 340/539.32 |
| 2005/0068168 A1 * | 3/2005 | Aupperle et al. ........ | 340/539.13 |
| 2005/0148339 A1 * | 7/2005 | Boman et al. ............. | 455/456.1 |
| 2007/0060311 A1 | 3/2007 | Rowe et al. | |
| 2007/0268138 A1 | 11/2007 | Chung et al. | |
| 2008/0218351 A1 * | 9/2008 | Corrado et al. ............ | 340/572.4 |

OTHER PUBLICATIONS

Notification of Transmittal of the International Search Report and the Written Opinion, from the International Bureau, in corresponding International Application No. PCT/US12/30046, mailed Jun. 27, 2012, pp. 1-4.

(Continued)

Primary Examiner — Phung Nguyen
(74) Attorney, Agent, or Firm — Juan Carlos A. Marquez; Morris, Manning & Martin, LLP

(57) ABSTRACT

The present invention is directed to a miniaturized apparatus to locate, track, recognize and control objects using miniature RF circuits that are programmed as an active tag or as one of several embodiments of a controller, including one small enough to be incorporated into a personal object, like a ring. In its simplest embodiment, a portable or wearable controller communicates wirelessly with a tag secured to a surface, analogously to a car remote—push button, receive a signal from tag or back at the controller, to locate tagged object. In more complex forms, the tag can be integrated into objects or connected to a network. One controller can manage a plurality of tags. The basic platform of tag and controller can be built up to create a sophisticated area control with environmental sensors, inventory functions, tracking individuals and allowing or denying access, operating objects like doors and lights, and creating supporting ambient security with checks and balances between tags and controllers on people and their possessions, such as baggage at an airport. Arrays of tag or controllers extend the wireless range to accommodate large structures and areas. This novel system is self-contained, with a low power protocol to give long battery life time and does not require internet or GPS to perform its functions.

32 Claims, 8 Drawing Sheets

(56) References Cited

OTHER PUBLICATIONS

Sandra I. Erwin, "Tracking Military Supplies No Longer Requires RFID", NDIA's Business and Technology Magazine, May 2007, http://www.nationaldefensemagazine.org/archive/2007/May (2 pages).

Mary Catherine O'Connor, "DOD Issues RFP for Active RFID", RFID Journal, Aug. 26, 2008, http://www.rfidjournal.com/article/print/4280 (3 pages).

Notification Concerning Transmittal of International Preliminary Report on Patentability for corresponding application PCT/US2012/030046 mailed on Oct. 3, 2013.

* cited by examiner

APPARATUS AND METHOD FOR LOCATING, TRACKING, CONTROLLING AND RECOGNIZING TAGGED OBJECTS USING RFID TECHNOLOGY

CROSS RELATION TO OTHER APPLICATIONS

None.

BACKGROUND OF THE INVENTION

1. Field of the Invention

The present invention relates to intermittently active radio frequency identification (RFID) tags to locate, track, control, and recognize animate or inanimate objects.

DEFINITIONS

As used herein, the following terms have the following meanings, unless otherwise specified:
RFID: radio frequency identification
Tag: an active miniature RFID tag
Controller: a portable controller, a wearable controller, a central control unit
Signal: beep, chirp, light etc., mechanical, display with arrow or symbol, silent (stealth) logged and sent wirelessly later or sent wirelessly directly
Button or switch: tactile switch, membrane switch, capacitive switch
Input interface: a button, multiple buttons, a combination of buttons
Take Action" or ("Action"): one or combination of internal tag operations, such as logging, counting, storing data, and changing its configuration, that do not produce signals; and/or signaling, which includes, a beep, a chirp, a light etc., mechanical, display with arrow or symbol, silent (stealth) logged and sent wirelessly.
All other terms used herein not specified above shall be understood to have their common meaning as used and understood by those of skill in the art and in the relevant industry.

2. Background of the Invention

There is a long-standing use of radio frequency identification (RFID), starting in the 1960s with the SICARID (Siemens Car Identification), which uniquely identified train car wagons and car parts in production. That technology used passive RFID: a tag on the object is irradiated with RF waves from an RFID reader, in this document called a controller; the tag then uses the energy to emit an RFID signal back to the RFID controller that contains its identification, location or other data. The RFID controller receives the RFID tag information. Passive RFID tags can also store parts of that signal's energy in a temporary power storage unit, such as a capacitor, to do calculations, access memory, and create their own RF signals. Passive tags are now applied to almost any stationary or moving objects, including people to identify in near field.

Over time, RFID technology has developed active RFID tags. Active RFID tags can also detect and receive an RF signal directly from a controller and store parts of the incident RF energy, but they have an independent onboard power source, such as a battery, or are connectable to one. They can thus transmit the RF signal autonomously, at a selected time or at programmed triggers, as from a temperature sensor. Their onboard power source also gives them a longer range than passive RFID tags. Another difference is that active RFID tags are not restricted to one-directional communication of the same bits of information, i.e., the same packet per transmission, like a garage door opener, for example, which can only transmit one instruction, "open/close." Active RFID tags can transmit more complex information, such as conducting sessions (send/receive) for authorization as a challenge-response exchange, as well as for acknowledgements and retransmissions. Active RFID tags are familiar as toll collection transponders for ETC (Electronic Toll Collection), as used in the E-Z Pass bridge toll in the U.S.

All active and passive RFID tags consist of an antenna, reception and transmission components, and a processing unit or circuit to perform calculations, such as accessing memory to read or store data. A typical RFID tag can hold up to several kilobytes of data, for example, a license tag with a serial number. Active and passive RFID tags and their controllers do not need to be "in line of sight" with each other to communicate. Examples are keyless entry systems in vehicles and ID "chips" implanted in animals. The state of the art of range for both active and passive RFID tags is several meters, but passive tags only accomplish this range at very narrow angles of the antennas to each other.

Both active and passive RFID have been developed for specific and generally in-house or local purposes, like toll collection (active) or shoplifting detection (passive). Agreements across systems and other attempts at standardization are in the works, as with RFID specification EPC Gen 2 UHF (ISO/IEC 18000-6) defining a wireless protocol for both active and passive RFID for possible interchangeability between developed systems.

As RFID technology has evolved, it has become miniaturised. Recently, passive RFID tags have become as small as 0.05 mm by 0.05 mm, and thin as a sheet of paper. However, active RFID tags are expensive. Active RFID tags cost from 10 to 50 cents (US) each, and RF signal controllers or readers cost up to US $1,000 each. These costs are especially prohibitive when RFID is put to its logical use of supply chain tracking, which requires significant numbers of controllers and RFID tags. Even passive RFID systems have proved too expensive for large-scale use. Retailing giants like WalMart, with over 20,000 suppliers, have gone from insisting that all suppliers' products have RFID tags to only using RFID for in-store tracking. The US Department of Defense (DoD) underwent a similar change: after mandating RFID in 2003 for supply logistics, the DoD dropped that requirement in favor of implementing more GPS-based technology. In addition to budget considerations, there were concerns that RFID was not efficient and not accurate for bulk liquids and metal (NDIA (National Defense Industrial Association), May 2007, "Tracking Military Supplies No Longer Requires RFID" Sandra I. Erwin—same source for Walmart data). On the other hand, the Department of Defense continues to issue RFI and RFP requests because of the inherent utility of the technology, but the requirements are high and the DoD is seeking multiple suppliers and vendors (RFID Journal, Aug. 28, 2006, "DOD Issues RFP for RFID" Mary Catherine O'Connor), which shows that the DoD does not wish to give up on this technology but has grasped the difficulties in creating a versatile, reliable and economic system.

Thus, in respect to cost, available active RFID is no real improvement over passive RFID and remains limited to isolated systems. Active RFID tag technology has yet to fulfil its potential. It lacks the versatility to adapt to myriad different situations. RFID controllers are still large, about the size of a larger PDA with a hand-sized antenna attached to generate the required RF field. Another issue is that some applications, transmitting over a longer range, require the RF beam to be aimed in the direction of the active target RFID tags; an application needing an omnidirectional signal will have a much shorter range. Thus, active RFID tag technology remains limited to specific purposes in defined physical areas. Even at its most mobile, the technology can only communicate with matching active RFID tags in passing cars; in that case, only the RFID tag, not the controller, is mobile, and there are still ongoing concerns about the accuracy of these RFID tag/reader devices.

3. Prior Art

The use of active RFID tags for locating objects is known in the art. The RFID tags are attached to an object; a controller is then used to locate the object by a wireless transmission to the RFID tag, activating it with the wireless energy and reading the response that the RFID generates from the incident energy and the RFID reader determining the signal strength of the response so as to deduce the distance.

U.S. Pat. No. 6,600,418 is directed to warehouse management and discloses fitting RFID tags onto objects and/or fixed locations that enable a specially equipped vehicle to find objects or place the tagged object. The RFID tags carry information on the identity and location of objects in the warehouse. The driver of the vehicle, such as a forklift, can track down an object without having to leave the vehicle to do bar code scans. The operator is guided by lights, audible beeps, or a graphics display integrated into the vehicle. This system is limited to inventory and shipping-related tasks, and also requires a central computer. Overall, this invention is directed to specific conditions, a vehicle and mechanical locomotion to store and retrieve objects. This invention does not disclose details about the power management of the active RFID tags nor how their information is calculated into a location. This system is of limited practicality, since it is dedicated to large-scale warehouse inventories.

U.S. Pat. No. 6,661,335 discloses an asset management system with fixed sensors and readers in a building to track a moveable asset that has an RFID tag called a transponder. The sensors track the object's movements and location by sending signals back to a processor/computer system. The system is not miniature because it contains three antenna coils, one in each xyz direction, and each must be directional, as required by the invention. Hence, the tracking devices are larger than RFID tags using an omnidirectional antenna. The invention is portable in principle but would be cumbersome. Unlike the '335 patent, our invention disclosed herein is truly miniaturized and designed for portability and versatility; it achieves the same range with an omnidirectional antenna, independently of the direction the RFID tags or controller are positioned.

U.S. Pat. No. 6,396,438 discloses the use of stationary sensors that can determine the position of an RFID transponder. The sensors have a plurality of antenna coils arranged in unique physical orientations to transmit RF signals of differing phases; the transponder receives these signals and compares the phase of at least two to determine the relative position of the transponder. The system requires a minimum size, determined by the wavelength of the frequencies used: 400 MHz and 2.4 GHz, requiring a device 3-16 cm in size. The minimum distance of the antennae for a phase shifted signal as described in this frequency range is also 3-16 cm. The '438 patent, unlike the present invention, relies on multiple antenna coils permanently affixed in a structure; the present invention is a system that is portable, calculates positions through triangulation and signal strength of at least two RFID tags, and can add run time differences. It can also work with a single tag calculating distance through signal strength and also can add run time differences.

U.S. Pat. No. 7,405,663 discloses a system for detecting RFID tags in an exit control system to prevent the unauthorised removal of tagged objects. A plurality of antennae radiate power to tags within the protected area, which is described as an interrogation corridor, a large, complex system integrated into a building. This invention uses passive RFID but is more complex than a passive anti-theft tag system commonly found at the doorways of shops, for example, as it covers an area approaching the exit and can specifically identify the object being removed. This patent requires a complex system fixed into a structure. The system cannot track in "open air" and is not itself mobile. The invention we disclose is active RFID and does not require a homogeneous or distributed RF signal in an area to power up RFID tags that are nearby; it powers up using its own onboard source independently of any wireless signal.

U.S. Pat. No. 7,274,292 discloses a proximity management system around a central control device, which can be realised as a wireless communication device, including a cellular or wireless telephone, a personal digital assistant (PDA) or a handheld portable communication device. The '292 patent uses a computer to group tagged objects by purpose, such as "work" or "camping." The system tells the user when the objects in a selected group are either within or beyond a pre-set radius. Each object has its own identifier and a graphical user interface displays the groups and objects for selection as well as information about the location of these objects. An essential feature of this technology is the graphical interface and computer, which allow data entry of individual/associated objects and then creating the groups the user desires. The '292 does not discuss the design of the wireless protocol nor disclose whether the devices communicate in a synchronized protocol. Although the patent claims that the controller knows the geographic location of objects, there is no detailed information on how this occurs. In effect, the invention is a sophisticated electronic "reminder" system designed to inform the user whether a desired set of tagged objects ("vacation") are in proximity to the user, for a kind of roll-call prior to departure. Some objects may be used only once a year, which raises questions about battery life. An additional shortcoming in this and similar inventions is that the central control, much as with television remote controls, must itself be found first. Finally, an essential feature in the '292 patent is the graphical user interface to configure and operate the system, which is complex and makes the device at least cell phone size. Our invention differs because it allows true searching and locating, as well as controlling and recognition functions, and it does so with just two miniaturized circuits that are integratable into a ring or other object that is always with the user.

U.S. Pat. No. 7,242,293 discloses a proximity alert system that is connected to a human or robotic hand to alert a caretaker or observer when the hand is too close to a tagged object. For this specialized purpose, the '293 apparatus is limited to a very short range of 25 centimeters, and is only deployed in a very specialized field of use.

Given these shortcomings, as well as those described in the introduction, it is non-obvious to look to active RFID as a reliable, versatile system that can be adapted to locate, track, control and recognize objects. While passive RFID is accepted in passports and other devices, these remain limited to local systems and specific purposes. GPS, even with its own limitations, including requiring a satellite link, lack of precision (finding an object in a room), and signal issues (inoperable in a basement, for example), is actually edging out existing RFID applications.

SUMMARY OF THE INVENTION

There is a need to overcome the limitations of the prior art and the drawbacks of existing RFID, which remains expensive, complex, bulky and inconsistent in results. There is a need for an apparatus that is miniature, inexpensive, versatile, active, reliable, easy to operate, and adaptable to a variety of locations and ID uses. In its basic configuration, the apparatus consists of an active RFID tag attached to an object to be tracked, located, controlled, or recognized by a controller. When the user activates the controller, the controller transmits an inquiry to the tag, which then responds with an audible, visual or tactile signal so that the user can find the object. Similarly, the controller can activate and control tags integrated in electrical switches, for instance, to power up lights in a room or open a curtain or blind on a window. Currently, only buttons on the wall or cumbersome remote controls can do this.

There is no self-contained device that allows a user to locate objects, like glasses, keys or pets, using inexpensive technology, active RFID tags and a controller small enough to be integrated for convenience into a finger ring, bracelet, fob, or other small wearable object. The tag and controller interaction should also be secure, in a recognition or identification exchange between the controller and tag as "friend or foe," for example, in an ID badge or USB drive that is required for a computer to work. Another application, explained in detail below, is matching checked in tagged luggage to a plane-side controller e.g. entry or baggage door of airplane. As self-contained circuitry, the controller can also be integrated into an existing device like a cell phone or PDA.

The present invention is a system with the advantage of affordability, both in manufacturing and in price point. The system and its components have a range of options in price and complexity, from a simple, disposable unit for a single trip or purpose in a basic set-up comprising at least a controller and a tag, ranging to multiple layered ambient industrial security. The basic apparatus is adaptable to different purposes. The same configuration is programmable to alert the user when a tagged object is being moved (stolen, for example) beyond a certain perimeter, or if the user has moved away from the object and unintentionally left it behind. For people, animals, and any moveable objects, the tag alerts to motion, as well as motion beyond a certain set limit. The alert or alarm can function in a variety of modes, such as stealth (silent) or with a signal detectable by human senses. Thus, the technology is scalable, from a simple controller with one tag, to an ambient secure zone in and around a home, to fully commercial- or industrial-scale applications. The configurations are discussed in the Detailed Description of the Invention.

Thus, the present invention meets the need for a basic apparatus, a minimum of one controller and one active RFID tag as shown in FIG. 1, which can be adapted into more complex configurations using multiple RFID tags and controllers. The latter allows for tracking and locating without GPS or internet connection, as well as additional functions of recognition and controlling tagged objects.

The apparatus is simple to learn and natural to use. For example, one embodiment of the apparatus incorporates the controller into a ring worn on a finger. Such a ring controller can be configured to use simple motions, like bending a finger or pressing a thumb against a finger, to activate or manipulate the control functions of the ring. One important aspect of this implementation is that it does not require full hand or finger strength or dexterity to use. If the device is too difficult to master, the purpose of quickly and easily activating a tag is lost, so the device must be as natural to use as pressing a fob to unlock a car, using a TV remote control, or button-pressing for cell phones.

The apparatus also is customizable in any embodiment to a user's individual needs, both in its method of operation and its purposes. Hence, its utility ranges from one user and a couple of tags to locate a cat, keys or reading glasses, for example, to systems with multiple users of a home "base station" where children and pets are monitored, to users with impaired memory, vision, or physical abilities who use the system as an assistive device. Commercial and military uses also range from extremely basic needs, such as protecting a code book kept locked in a workroom or a secure paper file folder in a legal or medical office. Locking or unlocking drawers and cabinets can be accomplished automatically when an individual wearing the proper controller moves into a pre-set proximity to the target. This is accomplished by measuring the signal strength and by this determining the distance. The technology is an important enhancement for existing security, which may only detect intrusion or unauthorized exits only by doors or windows. Even more sophisticated systems with motion, sound, smoke, or infrared/heat detectors, cannot actually track and locate objects within the premises. When objects are not moving, not making a sound, or not generating heat, they are invisible to the system; security staff are required to monitor traditional cameras to catch incidents or track where people and objects.

To further increase its utility, the disclosed apparatus features long battery life (at least 3 months, 6 months with average use). The circuit and its housing are resistant to electromagnetic interference and water resistant; the device is rugged enough for everyday use and is meant to be taken for granted like a proximity ID card or car key fob. Because of its simplicity, the controller is ideal for children, the elderly and disabled individuals. Worn as a ring or a "dogtag" around the neck, the device can be always available and one touch can carry out an action. This is a marked improvement over having to find a remote, or remotes, or summon assistance for basic activities like turning off lights. The controller can have more complex input mechanism configurations for individual user-programmed actions, which can be actions for an individual object or a group of objects, such as the following or any combination thereof:

"accept"
"silent for a certain time"
"remain silent until xyz device is in wireless range"
"shut down"
"silence"
"find all"
"find object with ID xyz"
"loose tracking"
"urgent tracking"

Because of the versatility of signalling, a sight-impaired person is able to locate objects by sound and a hearing-impaired person is able to locate objects by looking for a visual signal, e.g. flashing light. Locating an object or person in cluttered, dark or other difficult circumstances is simpler and quicker: when the apparatus is carried or integrated into every-day objects the user carries anyway, the means to find the person is always available without the need for special equipment, internet access or GPS. The disclosed system also operates in a mobile environment, such as a bus, plane, or train, without loss of effectiveness.

Another feature of this invention is its independence from expensive and complicated technology such as the Global Positioning System (GPS) to locate objects, which requires a device with satellite access. There are some areas GPS cannot reach and its resolution abilities are not precise enough to, for example, locate a misplaced flash drive in an office. The present invention uses triangulation for localization. The distance is measured by signal strength. In the advanced setup, where more precision is needed, run time differences are factored.

The present invention is simple and powerful enough to do its work without the requirement of an internet connection, though some applications are internet friendly including, for example, monitoring an area remotely, so that a person at work can remain in contact with a central control unit at home.

Thus, the present invention is directed to an apparatus and system used to 'tag' anything, permanently or temporarily, and if completely embedded or designed into objects, to be inaudible or unseen, if desired. The tags can signal a user in a variety of ways, including chirps, beeps, or other sounds, flashes of light, silent alarms, mechanical alarms and any combination thereof. The tags not only alert the user, but provide information and signals to locate the object, even if it is out of configured range. For high value recoveries, an object out of wireless range is recoverable via an enhanced, mobile controller that is driven, walked, or flown over an area to activate the tagged object. The disclosed tags only respond when queried by the controller with the right encryption and packet. Even microwave sniffers will not be able to detect the disclosed tags unless they transmit the proper inquiry. The invisibility of the security means that a thief will not know that an object is tagged or trackable, much less how to remove or disable the tag. This "invisibility" also allows a name badge, for instance, to act as a controller for entry to areas while also carrying an active RFID tag that allows the individual wearing the badge to be tracked by another controller. This technology permits a security service to unobtrusively go through a building to take inventory or have stationary observing position, integrated into a USB flash drive to observe any room that has a computer or USB port. This is discussed further below.

The "friend or foe" mode of exchange between tag and controller allows computer flash drives, DVDs and CDs as well as laptops themselves to be recognized by the system once tagged. Thus, secure information cannot be removed from site without detection. If the tag or miniaturized circuit is attached to or integrated into all storage devices within a company, data cannot be offloaded onto tagged but unauthorized storage drives nor onto untagged storage devices. Tagged but unauthorized flash drives will not operate with a computer unless the computer's controller can recognize the tag attached to or integrated in the storage device, e.g. flash drive. Thus, viruses, malware, or spyware cannot be sent to the computer. The theft or loss of a flash drive or even an entire laptop is less of a disaster when the devices will not work without the right controller nearby; even password cracking software will not help. Since so much government and corporate information is digital and workers also use laptops that are highly portable, the loss of the equipment need not mean the loss of the data with an accompanying security breach.

The present invention also allows an instant alert that is configurable, from 1 to n seconds delay. A non-zero setting allows for fading and very short breakups through standing waves, reflections, submersion underwater or similar shielding.

The circuit in this invention is adaptable with the use of any sensor connected to the circuit, communicating uni- and bi-directionally through one or more sensor ports. The exchanged signals may be either digital or analog. Examples are temperature, humidity, light, bend, deflection, strain, attachment sensors, the latter e.g. measuring the capacitance to another sensorial input or potential in the circuit to act as a capacitive switch and report whether the device is properly attached or has become detached, damaged, or tampered with.

BRIEF DESCRIPTION OF DRAWINGS

Various other objects, features, and attendant advantages of the present invention will become more fully appreciated as the same becomes better understood when considered with the accompanying drawings, in which like reference characters designate the same or similar parts throughout the several views, and wherein.

DETAILED DESCRIPTION OF THE PREFERRED EMBODIMENTS

Figure 1:
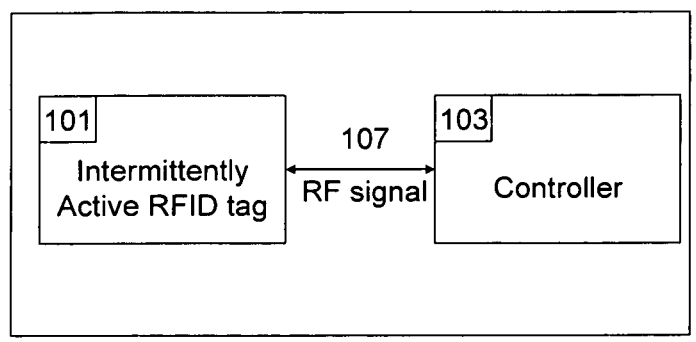
FIG. 1 is the most basic setup of the operation of the system

FIG. 1 shows the most basic arrangement and operation of the system. A controller 103 sends a wireless RF signal 107 to an active RFID tag 101. The tag receives the signal and also has the ability to send wireless signals back to the controller 103, and also to generate sound, light or other signals. The operating and alarm distance between a tag and the controller is set by the user when the tag 101 is first attached to an object or upon later configuration. Should the tag or the controller move beyond the preset distance, an alarm is generated at the tag or the controller. If the user wants to find an object bearing a tag, the user activates the controller by pressing a button or touching a capacitive switch on the controller. (See FIG. 2) The tag 101 responds with a sound or light or other means as programmed by the user. This basic platform is adaptable to a wide range of embodiments and applications.

Figure 2:
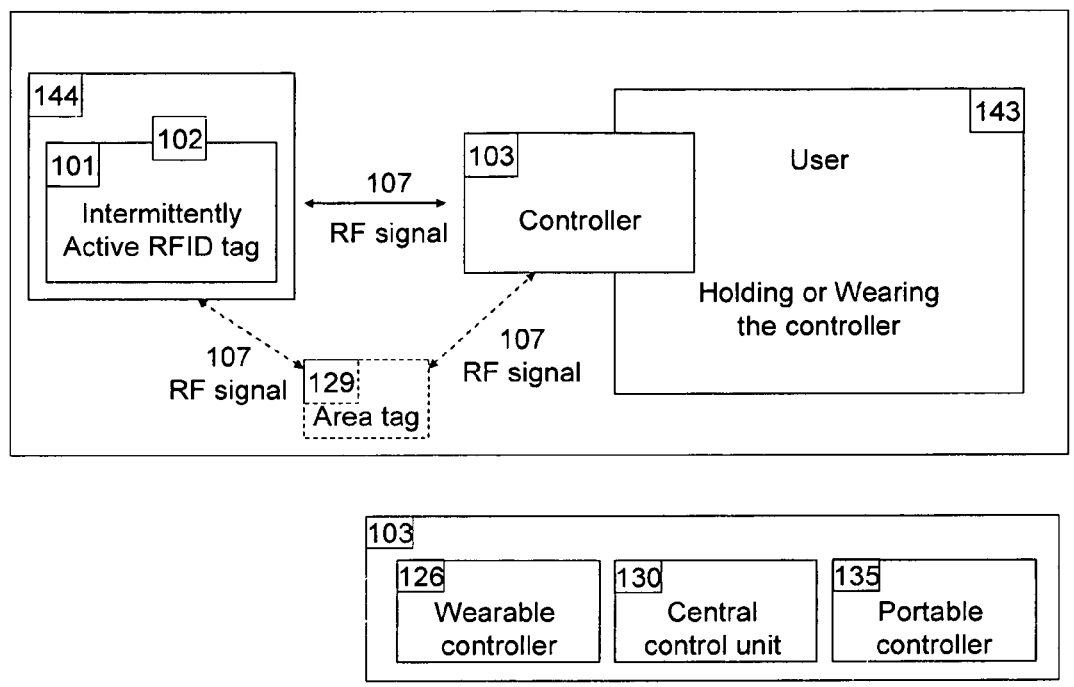
FIG. 2 is a schematic of the layout and operation of the system.

FIG. 2 illustrates the basic use and operation of the system. A user 143 holds or carries a controller 103. The user has placed an active tag 101 on an object 144, such as a cell phone or pet collar, to create a tagged object 102. One controller can manage multiple tags, each associated with a specific object. The tag 101 is attached by adhesive or mechanical means. Alternatively, the tag 101 can be integrated into an electronic device. The tag 101 communicates with the controller 103, and vice versa, via a radio frequency (RF) signal 107. The tagged object 102 is now a target that can be located, tracked, activated/deactivated, and recognized by the controller 103. An area tag 129 communicates with both the fixed tag 101 and the controller 103. It can extend the range of the controller 103 and the fixed tag 101, and rather than being placed on an object to form a target to be located, for example, the area tag surveys an area and is affixed to a wall or other stationary object and communicates with one or more other area tags 129, object tags 101 or controllers 103.

There are several types of controller 103. The wearable controller 126 is contained or housed in an object that is meant to be worn. FIG. 5 shows a detailed example of the controller within a finger ring. An object that is wearable, like a fob, necklace, bracelet, or pin, for example, is always with the user and immediately to hand. The controller is also concealed in these embodiments. The portable controller 135 is in a housing that is meant to be carried and is easily mobile, for example, integrated into a flash drive, cell phone, or custom device to be carried for special purposes or plugged into a car auxiliary port. The central controller 130 may be a base station, in a home or work computer, built into an area to communicate with area tags, or a base station unit in a vehicle that patrols a given area, for example. A central controller is generally sophisticated enough to have a display or graphic display and/or be contained in a flash drive, as in FIG. 4. Any controller can also perform as an active RFID tag and be under the control or another controller for tracking, for example. These basic embodiments allow for variations and combinations, and are not meant to be exhaustive.

Figure 3:
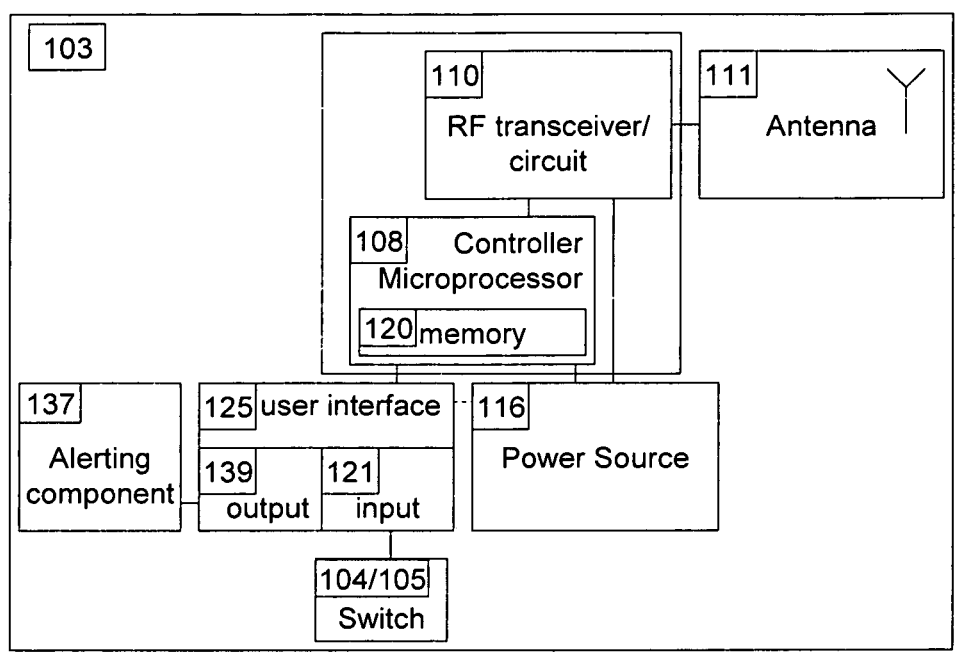
FIG. 3 is a minimum schematic of a controller.

FIG. 3 shows the structure of a controller 103. The controller has a microprocessor 108 to control the device and its operations. This programmable, clock driven IC processing unit accepts input and provides output to the circuit, performs calculations, such as encryption, and controls vital functions. The RF transceiver or RF circuit 110 can also be designed to execute different functions independently of the microprocessor The memory 120 is a flash memory, a RAM, a ROM, or other compatible memory, and which is adapted to store key codes, key code modifications and a list of all tagged configured objects for a controller and known/friendly devices or group of devices. The memory allows the controller to survey and check the presence of its associated objects continuously and log last contact with each. The RF transceiver 110 allows the RF signal 107 to be transmitted and received via a miniaturized antenna 111. The antenna can be folded and shaped to fit a given configuration. The power source 116 powers the circuit and is a battery, such as a coin cell battery, a double layer capacitor, a lithium ion battery, or a thin film battery. The user interface 125 with input 121 with at least one input switch 104, 105, allows the user to program and operate the controller, ranging from initial set up and teach-in of tags 101 to subsequent operations of finding, tracking, controlling and recognizing tagged objects 102. The controller's output 139, with at least one output device 137, provides alerting/notification signals to the user 144. The RF transceiver or RF circuit 110 also accommodates upgraded circuitry so that the microprocessor 108 can determine the distance of the tagged object based on signal levels of response signals and/or run time differences; in this way, the controller is able to notify the user when certain tagged items are outside the user-defined distance. In embodiments with a received signal strength indicator (RSSI) the controller is able to determine when tagged objects are outside the user defined distance.

Figure 4:
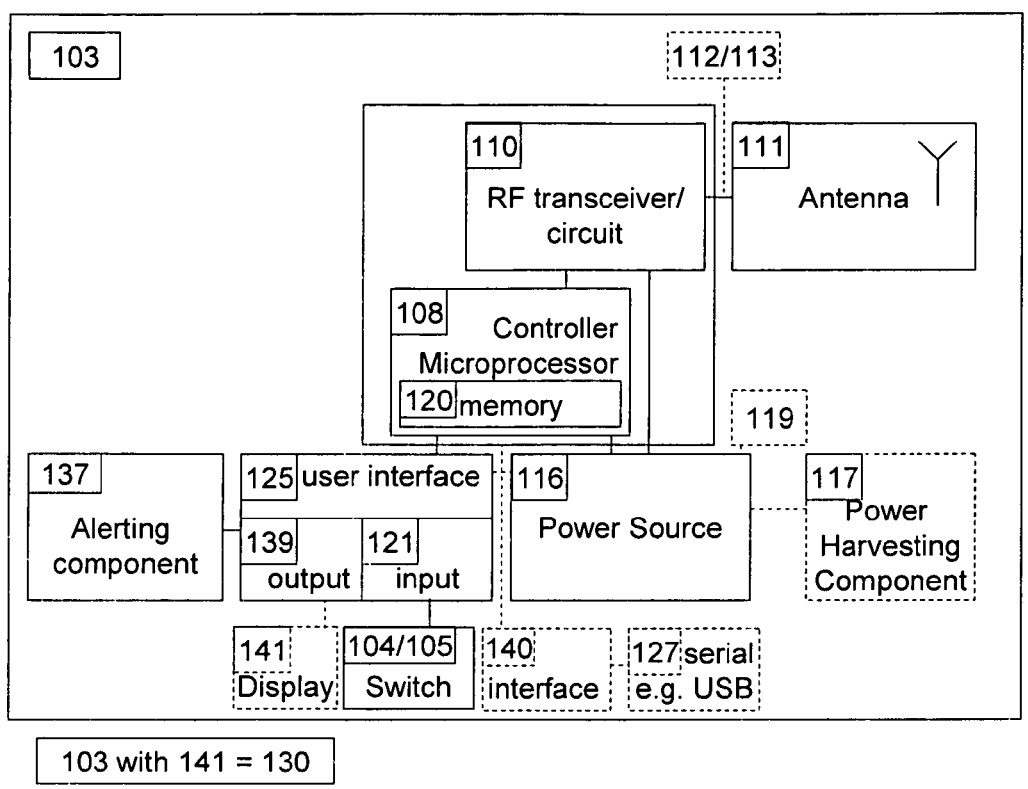
FIG. 4 is a detailed diagram with all option of a controller.
Figure 5:
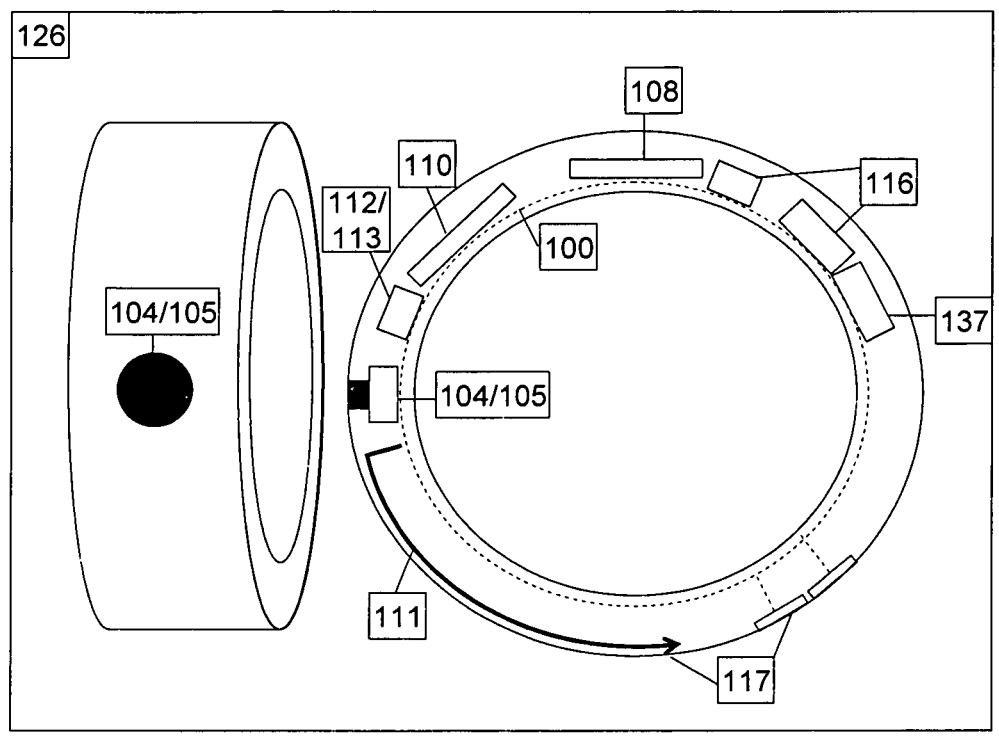
FIG. 5 shows an example of a wearable controller embodied as a finger-ring.

FIG. 4 shows additional embodiments for the controllers 103. A display 141 provides output to the user as information; if the display has a touch screen, it can also act as an input interface for the user. The user can select a profile, configure the system or tags, view associated items and their configurations, see lists of taught-in tags, their locations, time of last contact, and other information. In some embodiments the user may monitor a signal strength indicator on the display for a particular item to determine the missing item's location. The display is especially useful for more complex applications, such as area tags. Controllers with displays 141 are generally referred to a central control unit 130. The controllers 103 also can have an interface 140 to the outside, for example a plug/jack to allow connection to a computer by serial connection, e.g. USB 127. Another embodiment is a power harvesting component 117 to extend battery life via a solar cell, PZT or other method known in the art. A second component of the power source is a capacitor 119 to stabilize voltage and to supply peak current for the circuit 100. The antenna 111 has an embodiment in which it is connected to a matching circuit or component 112, a mismatch control loop 113 for optimization of antenna performance, which is a mismatch detector circuit and switch. These components measure and compensate as needed for antenna mismatches (e.g. close to metal or water).

FIG. 5 illustrates the wearable controller 126 in one embodiment, a finger ring. Externally, the ring looks like a normal ring. The housing 123 can be adapted or customized with any outward appearance. The miniaturized circuit 100 makes such embodiments possible, because it can be produced in a strip-like form that is bendable into various shapes, including a circle. Internally, the ring contains the circuit 100, which includes a controller microprocessor 108, a transceiver or RF circuit 110, an antenna 111, and a power source 116. The circuit also provides a user interface with an input 121 (see FIG. 3, 4), a mechanical tactile switch 104 or a capacitive switch 105. The circuit also provides an output 139 (see FIG. 3, 4) for an alerting component 137 to generate notification signals. In some embodiments the wearable controller 126 may have an energy harvesting component 117 and a matching circuit 112 and a mismatch control loop 113.

The user wearing the ring simply applies pressure by thumb or other finger to the input 121, which causes the circuit 100 to transmit an RF signal from the antenna. The tag 101 on the tagged object 102 responds to this signal with a beep or other signal, based on its set-up. Similarly, the input 121 can allow the user or controller 126 to communicate with multiple tags or perform different operations based on the number of times 104/105 is pressed or whether the tactile switch 104 is pressed fully or partially.

Figure 6:
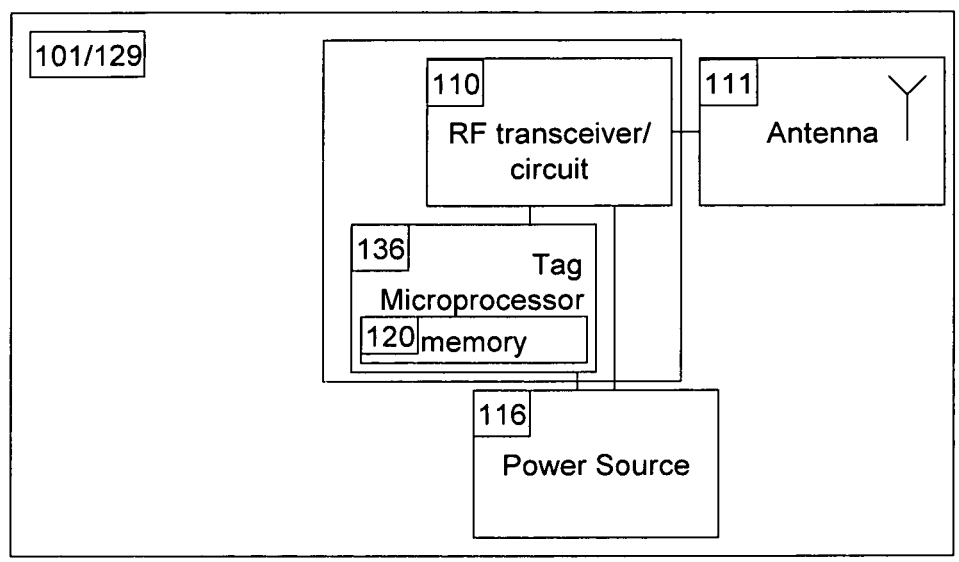
FIG. 6 is a minimum schematic of the intermittently active RFID tag.

FIG. 6 shows the basic components of the intermittently active RFID tag 101 or area tag 129. The parts are identical to those in the basic controller of the previous figures. Like the controller, the tag has a microprocessor 136 with memory 120; there is also an RF transceiver or RF circuit 110, antenna 111, and power source 116. In some embodiments, RFID tags 101 are attached or secured to personal items or objects that the user does not want to misplace or leave behind, like a cell phone, or for animals, like a family pet, whose whereabouts are not easily found out. The tagged object can be located, tracked, recognized and controlled by a controller. Another embodiment is the area tag, which—usually in groups of more than one—are fixed to surfaces like walls, for example, to interact with tags of the first sort, other area tags, or controllers. Area tags are further characterized in FIG. 7.

Figure 7:
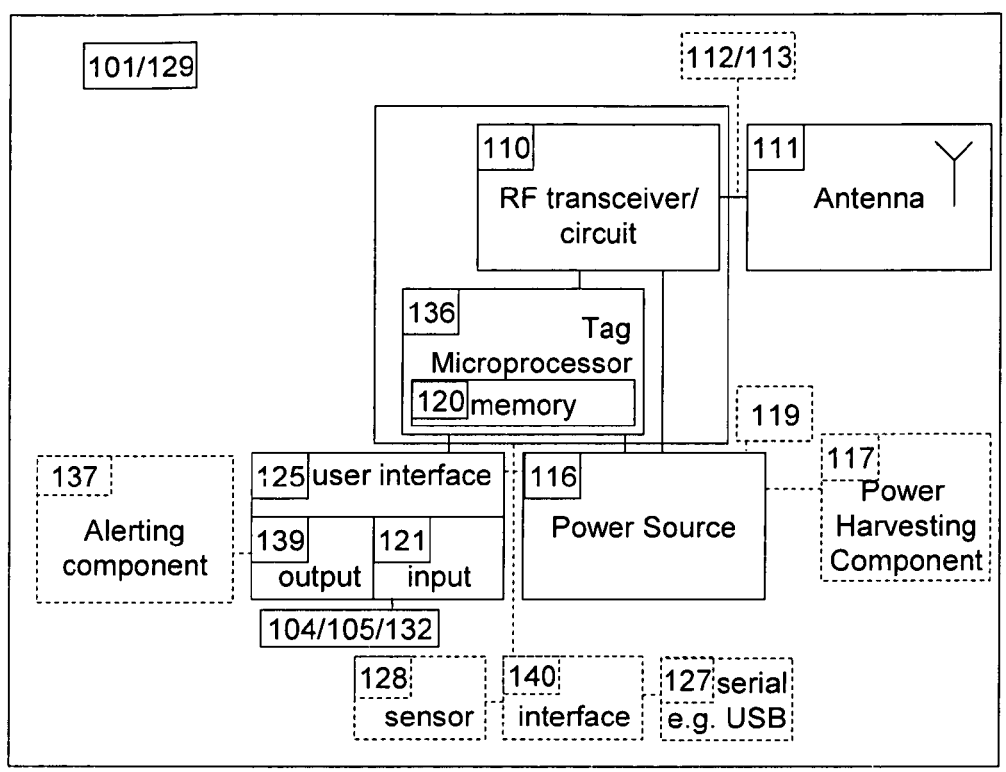
FIG. 7 is a detailed diagram with all option of the intermittently active RFID tag.

FIG. 7 illustrates various embodiments of the intermittently active RFID tag 101. The components are again like those of the tag as represented in FIG. 6. The tag has a user interface 125 for input 121 through switches 104, 105, a power harvesting component 117, an antenna 111, a matching circuit or component 112, mismatch control loop 113 to measure and compensate as needed for antenna mismatches that occur when the antenna is close to metal or water, for example. An output component 139 operates one of the output devices 137 for alerting and notification signals. The tag makes a beep or other sound, flashes a light, responds mechanically (vibration), wirelessly notifies the controller, or logs the event, depending on its programming. Like the controller, the tag also can accommodate an interface 140 (e.g. 2-wire serial UART connection or USB 127). Unlike the controller, however, the tag has the special feature of an attachment sensor 132, which verifies that the tag is securely and properly attached to an object 144. The sensor confirms initial attachment and will subsequently alert if the tag has become loose or has been tampered with. Also unlike the controller, the tag has a sensor interface 128 to allow the external attachment of a sensor. The sensor allows the tag to monitor environmental conditions, like temperature, motion, tension/stress, or other selected factors. The tag can alert a controller or other tag when pre-set parameters are broken.

Figure 8:
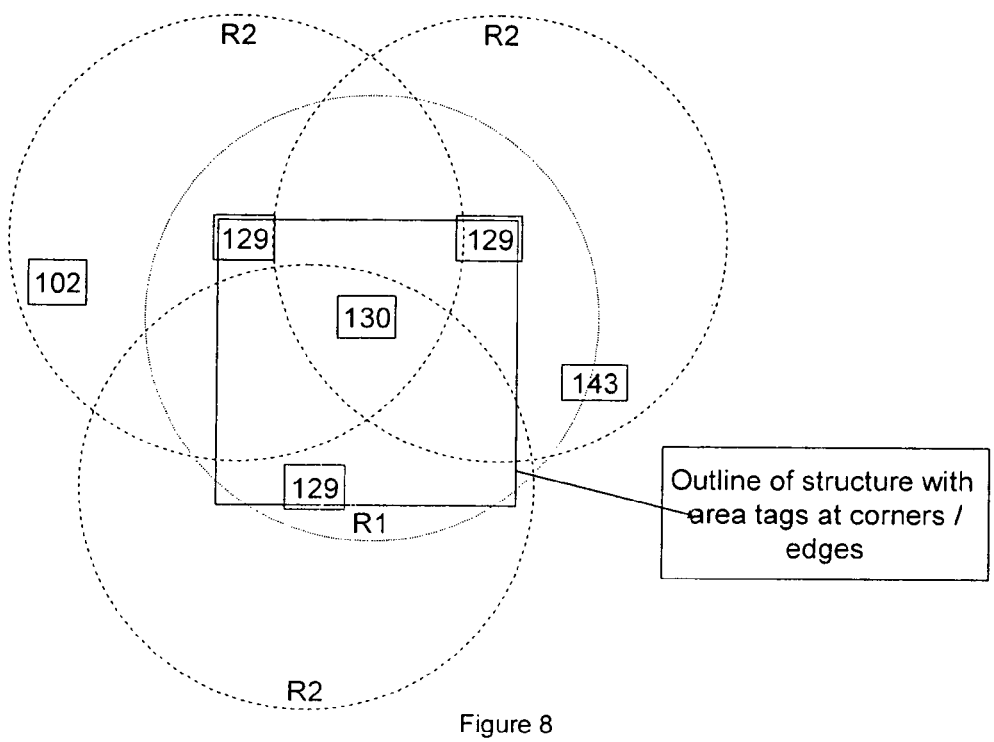
FIG. 8 shows the location and range of area tags and range of central control unit around a structure.

FIG. 8 shows a set-up and positioning of area tags 129 around a structure. This arrangement covers the entire area of interest. In this example, one tagged object 102 is being monitored within a predefined area. The area tags are being monitored by a central controller 130. The area tags extend the central control unit's coverage range. A central control unit on its own has a transmitting range to and from tags denoted by the circle R1; area tags 129 have a transmittal range to and from tags denoted by the circles R2. Note that the tagged object 102 is not within the transmitting range R1 of the central control unit 130, but is in the transmitting range of the area tags 129, which are in turn within the transmitting range R1 of the central control unit 130. Thus, the central control unit 130 communicates with and "through" the area tag 129 to reach the tagged object 102. In some embodiments, a notification to the user will exclusively be given at either the controller or the tag. In some embodiments, a notification to the user will only be given wirelessly to other devices in the apparatus or only logged to be read out later by other controllers or to be reported to other devices coming into range of the apparatus later. In some embodiments a notification can be provided when associated (taught-in) objects are outside user configured distance to the respective controller I. The Circuit:

The basic system/platform consists of a unique miniaturized circuit 100. The circuit is the basis for both an intermittently active RFID tag 101, which is attached to or integrated in a target 144 forming a tagged object 102 to be located, tracked, controlled, and/or recognized, and for a separate controller 103 that emits a signal to which the tag responds and receives transmissions from the tag. The software and the embodiment determine which function the circuit serves. The miniaturized circuit 100 is made from electrical components, e.g. IC, transistors, capacitors, populated on circuit board material that is adaptable to different physical shapes as needed, for example, to bend or curve. The circuit, as tag or controller, can be integrated into more complex devices, as discussed below. As a basic tag, the circuit 100 is realized as a flat strip, attachable to object with adhesive or mechanical means and no larger than 150 mm in length by 10 mm in width by 3.5 mm in height. In the simplest form, proper attachment of the tag to an object is determined when the tag signals upon proper attachment or responds to a query from the controller. More complex versions have tactile switches 104 or capacitive switches 105. In the case of multiple tags, the controller and tag can match wireless payloads 106, fully or partially, that represent IDs and thus have the tags respond or operate individually. The circuit 100 comprises an RF transceiver or RF circuit 110 or RF transmitter and RF receiver, a silicon die or a discrete circuit, e.g. a diode to demodulate. The RF transceiver or RF circuit 110 is adapted to receive signals and is controlled by a microprocessor 108/136 or woken-up by a special sequence of incoming RF signals 107 from other devices operating on the same RF frequency. The circuit 100 also emits RF signals, controlled by the controller 108/136, or independently from the controller microprocessor, wherein a mathematical unit and wakeup circuit 109 is present within the circuit 100 e.g. embedded in the RF transceiver or RF circuit 110.

In the simplest form the circuit realized as a tag triggers the output ports 139 to respond with sound or light, revealing the location of the tagged object 102. In addition, the controller has the capacity to use its RF transceiver or RF circuit 110 in receive mode to measure the strength of the RF signal 107 coming from the tag. Optionally 110 can measure a time delay of several round-trips of wireless exchanged packages to and from the tag to determine the distance by calculation. This is accomplished by a high data rate, fast detection of edges of RF signals, just as the end of a wireless package. The controller, depending on configuration, has an operating range to and from tags of up to 200 meters.

II. Antenna:

The basic circuit is connected to at least one miniaturized antenna 111 that can be folded and shaped to fit a desired configuration. The antenna allows the controller and the tag to communicate. The antenna is connected to a matching circuit or component 112, a mismatch control loop 113 for antenna optimization realized as a mismatch detector circuit/component and at least one switchable matching component. The mismatch detector measures amplitude and/or phase reflections and uses an adjustment circuit to improve the range and quality of the RF signal, which is adversely affected by buildings, metal, and other environmental factors. The circuit can change one or more component values of the RF matching circuit via a switch, known in the art as GaAs, CMOS or pHEMT switches, based on a mismatch condition, to compensate for the surroundings. The mismatch condition can also be reported to the microprocessor 108/136 and the switch be realized by setting an output port of the microprocessor 108/136, which is connected to 112.

III. Power Source:

The basic circuit is connected to an onboard power source 116: a battery, such as a coin cell battery, a double layer capacitor, a lithium ion battery, or a thin film battery. Based on unique power conservation programming/algorithms, even the most basic device has an operating life in active mode of at least three months (six months for average use), This life is extendable using a power harvesting component 117 operating via a light sensitive component (e.g. a solar cell), a RF sensitive device (e.g. a coil, antenna), a mechanically sensitive device (e.g. a piezo-electric PZT, a bimorph, a ceramic, a coil with a magnet) or temperature sensitive device (e.g. a bimetal).

The power source's unique low-power protocol 118 does not sacrifice miniaturization, range, security or response time. The response time of the tag is normally between 1 and 5 seconds, and the tag consumes minimum power while waiting for a request. The tag does not need to stay in continuous synchronisation with other tags or a controller to achieve this reaction time, nor will it result in a range or battery lifetime reduction by more than a factor of two. Instead of continuous synchronization, the tag intermittently wakes up to listen for a signal. Also, permanent "listening" is not required. The operating range of the apparatus in its simplest form is sufficiently greater than 2 meters, which is well beyond the limit in passive RFID tag technology even with beam antennas/coils. The operating range of the apparatus with its distance check and alarm function enabled is between 5 to 200 meters.

The power source further comprises a second component e.g. capacitor 119 which is used to stabilize the voltage within the circuit 100, especially in tags, providing peak current for RF transceiver 110 and output component 137.

IV. Microprocessor 108:

This programmable, clock driven IC processing unit accepts input and provides output to the circuit, performs calculations such as encryption and controls vital functions. The RF transceiver or RF circuit 110 can be designed to execute different functions independently of the microprocessor 108. Its logical functions, to check for specific RF signals, either signal strength or logical parts, to demodulate and interpret, are realized in the RF transceiver or RF circuit 110, which is thus independent of the microprocessor 108. This "wake-on radio" technology is known in the art and available off-the-shelf: the transceiver powers itself off and on, and while on, it listens for positive detection of a signal; if it hears the appropriate signal, the RF circuit wakes up the microprocessor and executes appropriate parts of the program.

V. Memory:

The memory 120 is a flash memory, a RAM, a ROM, or other compatible memory, and which is adapted to store key codes, key code modifications and a list of all tagged configured objects for a controller and known/friendly devices or group of devices. The memory comprises a table representing all tagged objects associated with the controller, allowing the controller to survey and check the presence of associated objects continuously if 1) object in range 2) object not in range; 3) object going out of range and 4) object coming into range. Thus, the memory represents a constant survey, presence check, and last contact of the tagged objects via their tag IDs, which are in-range of the controller. The memory acts as a recognition look-up table for the controller.

VI. Input/Output Mechanisms 121/139:

When the circuit is a central control unit, it requires at least one input mechanism 121, which is at least one tactile switch 104 or capacitive switch 105. More complex embodiments are described below, such as an embodiment into a USB stick or as a key-fob. When the circuit is a tag, a computer keyboard can take over the teach-in so that the tag does not necessarily need a button. When the circuit is a tag or a controller, it uses an output 139 as a means of response, by diode/light, sound, vibration. Alternative output mechanisms are a silent transmission to the controller or another device, which then acts upon the information. The alarm or feedback signals may be by beep or chirp, chime or other electronic tone or series of tones or sounds; by light, such as LED or lamp; or a wireless response, by sending off a wireless signal or storing/logging the alert and reporting the alarm upon being requested later or upon being in wireless range to a device. The audible signal can be less or more frequent (500 Hz to 10 kHz), soft, loud, levels in between (70 dB(A)-95 dB(A)). The light can change color, be soft or bright (20 mcd to 5000 mcd), blink or fade. These variations have the use of helping to home in on an object or indicate change in position and distances. Input and Output electrical lines allow for integration into other devices/systems.

VI. Communication/Transmission/Reception:

The controller and tag operate on a fixed RF frequency that is equal to or greater than 433 MHz. The system uses master and session keys. If a tag is not in sync, not taught-in, and not in tracking mode, first contact from a controller to a tag is made with a wireless packet encrypted with a master key. Challenge-response authorization methods known in the art plus a cipher algorithm for unique packets can be added to prevent interception, interaction from other systems, or attacks. "Unique" means the system has a near zero probability of reacting to a wireless packet that was recording and later replayed; on the extremely remote chance a tag did respond, the tag's controller would increase its counter for a bad packet, and then send or signal an alarm, or simply query the tag for a status check. To enable tracking mode the controller sends to the tags data including session keys, IDs and initial values. These values can be resent periodically afterwards, from every 1 second to 1 hour. With this data tags calculate, e.g. with a hash generator, the next wireless packets that will then be "expected" by the tags up to the next period. The controller does the same calculation. An answer from a tag is not required for the controller to know the tag is still present because the tag will answer on non-reception of the "expected" packet and other counters as described herein.

Each wireless packet responsible for reaction speed, e.g. the search function, contains a minimum preamble for better bit synchronization to improve reception/detection and ultimately response time. If operating range or alarm range set to short, a preamble can be omitted completely because the packets are short. The system is designed to operate on a single RF frequency only to lower the power consumption of switching to other frequencies or having to receive on multiple channels, but the system is able to switch as needed if the controller dictates. A controller and tag can be up to 2 km away from each other, depending on the set up and configuration. These variations are discussed in section "VARIATIONS AND MODIFICATIONS."

The master key can be changed over time. To avoid sending any key directly over the air only changes to the current master key can be communicated wirelessly.

VII. Housings:

The controller and tag can have almost any form or housing 123, concealed in a ring, bracelet, fob, strip-like flat form, or integrated into another electronic device, like a cell phone or jump drive. Since the controller can manage many tasks and tags, it can become complex in function but is, like the tag, inherently rugged. Both tag and controller are water resistant, shock resistant, and contain durable epoxy or plastic. Both can be concealed, as in an ID badge, or customized for specific uses. Tags are preferably in a strip-like form [0029] to be attached to surfaces.

VIII. Software:

The software 124 determines which function the circuit powers, controls execution of procedures and function depending on user input, wireless reception and external input.

Operation of the System

Set Up

I. Set Up:

A tag 101 is attached to an object 144 to be tracked, located, controlled, or recognized. In the basic set up, the tag signals by a beep or flash of light when it is properly attached. A controller's button 104 or 105 is pressed to confirm that the user wants a link between this controller and tag, which can "talk" wirelessly to each other after this teach-in step. Pressing a button 104 or 105 can have the temporary or conditional meaning of a teach-in button 142. This setup works for one or multiple tags. Alternatively, the user can press a button at the controller first. The system goes into teach-in mode signalling this to the user by a beep or flash of light. Then the user places the tag(s) on the objects and receives an acknowledgment signal after each placement. This works through capacitive sensors 132 on the backside of the tags or manually through pressing a button 104 or 105 at the tag after placement. To-be-linked devices need to be in close proximity to avoid false links to another nearby systems, especially untaught tags. A teach-in is accomplished in close range of <1 m by reading signal strength values. Each desired tag is taught-in/linked and the controller retains the identification and programming for each object.

The link allows to user to:

Make the tag beep or signal with light or other means so it can be located

Switch on an automatic tracking and proximity alert

Control the tag, e.g. switch on/off its output ports, e.g. linked to a power switch.

In the case of multiple tags, the controller and tag can match wireless payloads 106, fully or partially, that represent ID numbers and thus all, some, or even one tag can be selected.

II. Locating

After successful attachment of a tag to an object and the teach-in procedure above, the object can be located by activating the user-interface input 121 on the controller housing 123, thereby causing the circuit 100 to send a wireless packet. The tag 101, which wakes up periodically to listen, responds by emitting a signal. If the user cannot identify the location from the first signal from the tag, the input button is pressed again, so that the user can home in on the sound, if set up to do so; locating is also supported by a distance corresponding signal from the controller. If a tag is being sought that is not being tracked by or synchronized to a controller, a challenge response authorization is executed.

III. Tracking:

Tags and controller(s) can be set into a tracking mode, which makes them communicate at frequent intervals to detect changes in signal strength and direction due to change in position. Thus, tagged objects can be tracked, which may be as simple as detecting that the tag or controller is moving out of the other's range, as when a cell phone is left behind or a child is moving away from a group. More complex tracking functions including re-entry into range and keeping a group of tags in a pre-set proximity IV. Control:

The system allows the control of objects via an interface input 121 at the controller to on-switch or off-switch the tag's interface output ports 139. The controller's input buttons 104/105 are programmable for the object's functions, to turn a device or function of the device on/off/toggle/up/down/confirm/exit/lock/unlock. The user programs specific buttons to desired events, either as combination of button pushing or as a flexible function, which works by the user pressing one button until the desired tag responds with a signal; then the user presses a second button to confirm. For this procedure two buttons are required, one to toggle through the devices, the second to confirm the selection. The controllers and tags can also be programmed to automatically turn lights on and off as user/wearer moves about, to lock the door behind the user, like a car remote, and unlock it as the user approaches. This operation is accomplished by measuring the distance between controller and target tag.

Embodiments

Controller:

There are small wearable controllers 126, portable fob-like controllers 135, and central control unit controllers 130. The latter can configure the complete system by user input to its buttons or from a connected computer. All controllers consist of the hardware of the circuit 100 with microprocessor 108 and memory 120, an antenna 111, a power source 116, has input 121 and output 139. For 126 and 135, excluding the input/output mechanisms, the circuit is fully integrated into a housing 123 the user can wear, hold, or carry. The user can control other devices in the system by pushing a button or have other devices be controlled by the controller automatically. Control actions include tracking, switching on/off, lock/unlock, or report proximity to other devices.

Tag:

The tag 101 consists of the hardware of the circuit 100 with microprocessor 108 and memory 120, antenna 111, a power source 116 and has one input of 104/105/132, and output 139. The circuit is fully integrated into a housing 123, except for 104 for user input and openings to view or hear alerting component 137, so that the user can attach the tag 101 to an object 144. The housing 123 is preferably realized as a strip, can have double-sided tape for permanent or adhesive surface for temporary attachment. The output mechanism can be any combination of signals detectable by human senses or a wireless output mechanism.

A tag can be connected to environmental or automation sensors 128 measuring, for example, such factors as temperature, humidity, strain, force, pressure. The tag can have a capacitive switch 105 to replace the input mechanism 121. The capacitive switch 105 can also be used as sensor for close proximity. A tag can be integrated into power switches to allow the user to control the devices' power or switch them manually or automatically depending on the distance, determined by a wireless proximity check to these devices. For this, the user presses at least one button of the controller using 104 or 105 of the controller and with this controlling the tags output ports 139 to control power or switch a status of it.

Area Tag:

An area tag 129 used for range extension is a special embodiment of a tag consisting of the circuit with microprocessor and memory, an antenna, and a power source. For feedback to the user the user interface output 139 and an alerting component 137 is possible. The housing is similar to the tag, strip-like and flat in order to be unobtrusive. Area tags can be used to extend the wireless range between controllers and between controller and tags if these are too far apart. In this case the area tag enables communication between these by being able to communicate with both. An area tag used for more tasks than pure range extension can have the interface 140 to be connected to a network or can monitor/log sensor data 128 connected to it.

Combination/Linkage of Devices Forming a System

Links between devices are always wireless links: Wireless links (logical channels) are possible between controllers and between controller and tags 101. If area tags are being used by the system, a link exists between controller and area tag, and another between area tag and the target device. The protocol ensures the novel presence check method through wireless communication with a secure communication in a very low power application, as discussed hereinabove.

The arrival of a wireless packet containing a command or a configuration between controller and tags is acknowledged by the tag by a single packet or the first "expected" packet, so the controller knows the packet was received. After having sent session keys, IDs, and initial values, the controller switches to surveillance and starts sending short wireless packets of 2-128 bits payload to the tags to be surveyed. If the tag is being tracked and within range, the tag compares the actual content to the expected content; if there is a match, the tag sends an answer or alternatively, in the novel power save mode, remains silent because the content was as expected or the signal was too weak. If the packet was not received as expected, the tag answers as described hereinabove. The alternative mode preserves power compared to traditional methods of communication for presence check. These traditional methods define presence from successful reception and out-of-range from non-reception of the packet, coming from the surveyed tag to the controller.

Access to Central Control Unit and System Through www:

Central control units 130 or controllers with USB interface 127 can be accessed from a computer when plugged into the USB port or connected through an internal circuitry, e.g. on the mainboard of the computer. A web-based application will allow the user to monitor a setup without being on-site.

Detailed Description of Function and Operation of Components

Protocol and System Design:

The active RFID tag protocol 118 is designed to:

conserve power in all devices making each device last for at least three months in active mode (six months with average use) before recharge or new battery required to avoid false alarms due to fluctuation of the wireless channel to give quick reaction time on activation of a search/find/locate function to allow for tracking of tags around controllers and alerting if out of range to allow for other alerts deduced from recognition and distance to controller or position in areas and all of the above with tag response times of less than 5 seconds The Tag with Reference to FIGS. 1 and 2:

In a non-tracking mode, the tag's basic function is to listen for communication from a controller and then respond as programmed or asked. A tag "sleeps" whenever no wireless interaction or listening required and only checks and powers vital functions periodically. Upon positive detection of a wireless desired pattern, the tag's transceiver triggers a complete wake-up of the circuit, the tag remains more awake than normal for a limited time, the received packet is decoded with a master key or other known RSA key at this point in time, interpreted and desired action performed. The tag then responds to the controller signal or, since the tag has its own microprocessor, it carries out other actions, as discussed in "VARIATIONS AND MODIFICATIONS."

In a tracking mode, the tag autonomously and intermittently wakes up and periodically listens for the expected [0038], [0051] wireless packet from the controller on the physical RF channel. This wireless packet can be received from a tag (see "VARIATIONS AND MODIFICATIONS") or a controller. For the configured time of tracking, the tag periodically listens in the defined/configured slot and, with enabled power save mode, only sends a wireless packet if:

sync packet not received once to x times in a row or sync packet too weak once to x times in a row or an unexpected payload is received once to x times in a row or internal counter reached (e.g. 1 out of 10)

Further variations and soft decisions on when a wireless packet is sent are described in "VARIATIONS AND MODIFICATIONS" below. If defined to give an alarm, the tag counts the number of the above three events or a combination of these events and upon exceeding a threshold sends an alarm to the controller. Importantly, this message does not necessarily initiate an actual alarm in the system, which might turn out to be a false alarm due to fluctuation of the wireless channel. Instead, another communication, e.g. challenge-response authorization or another presence-check package is exchanged before the system generates an alarm. Thus, the protocol is designed so that tags report any change or unexpected behavior. Tags can also log failed access attempts and report later to a know controller or at a defined slot.

Tag Responses:

The tag responds by means of one of the alerting components 137 and can be a combination of:

1. a visual alert via LED, for hearing-impaired users or in environments where silence is essential, for example, a forward military position;
2. an audible alert, which is an alarm tone, but can be configured or loaded into the apparatus as ringtones;
3. a mechanical alert in the form of a vibrating mechanism, which has the same usefulness as cell and pager vibrating mechanisms;

In addition an alert can be generated by sending a wireless signal to the controller or logging events to be read out later by a controller.

Controller:

A controller with reference to FIGS. 2, 3, and 4 is a central device controlling tag functions. Depending on how the system is configured the controller can work in non-tracking and in tracking mode. In non-tracking mode and upon user input 121 to the controller to execute a function at a tag, the controller emits an RF packet or a stream of packets through its RF transceiver or RF circuit 110 and antenna 111; the corresponding tag(s) will answer with a signal when in wireless range unless defined to remain silent earlier or unless the tag cannot understand the packet, e.g. if it was linked to another controller. The controller can automatically monitor an area around the user, then being in tracking mode with tags.

Operation:

The controlling and monitoring of tagged objects occurs through the exchange of wireless packets through an ultra low power protocol 118. Localization in the surveyed area is done by support area tags and via the measurement of signal strength and, in some embodiments, time differences of arrival (run time difference) to area tags.

Area Tags:

With reference to FIGS. 2 and 8 an area tag 129 has similar functions as an object-attached tag 101. In tracking mode, the area tags remains in sync with the controller 103 just as an individual tag would. Additionally, the area tag can take over the task of sending a survey package to other tags at defined times, thereby replacing the controller's packet. The surveillance and alarm message from the tag will be received by area tags, controllers, or both. Signal strengths received by area tags will be reported to the corresponding controller in the survey packet, the one replacing the controller's packet. In the non-tracking mode of the system, an area tag will answer a search request by a controller as any tag would.

Attachment Sensor:

With reference to FIG. 7, the optional attachment sensor 132 for tags verifies that the tag is securely attached to an object 144 or surface. If the tag becomes unattached, the user can be alerted by the controller, if it is set to do so. The attachment sensor 132 is realized using a sensorial input of the circuit or microprocessor measuring the capacitance to another sensorial input or potential in the circuit 100. By reading the sensor's 132 value, the microprocessor can sense whether the device is attached, damaged, detached, or tampered with. When this occurs, the break causes the tag 101 to emit a 'distress call' to the controller if set to and/or generate a signal.

Applications of the System

Extended Example

A detailed example illustrates the versatility and utility of the basic tag-controller platform in its various embodiments. An airport is a large, complex environment that requires a range of security levels and has a diverse group of employees on site as well as a moving population of travellers and vendors, along with all the baggage, cargo, and other materiel.

Travellers:

A traveller leaving home for the airport has placed tags on luggage, phone, passport, wallet, and other personal items. Before departure, there may have been no tag on the suitcase, for example, so it now receives a new tag or a previously deactivated one that was removed after the last trip. Controllers with displays and keypads allow more complex and more straightforward teach-in and set-up with prompts, drag-and-drop features, and other software to simplify the teach-in process, but simpler versions of toggling through a limited set of buttons at a wearable or portable controller also work.

Thus, each tag has been "taught-in" when it was placed on its particular object, as described hereinabove. In this embodiment, the traveller uses a computer or controller to select the desired type of alarm, which can be set to audible, silent or vibrating, and to occur from the tag or at the controller. Each tag can be taught-in differently and set to different alarm modes, so that cell phone and wallet, for example, are set for extremely close range, which differs from home settings where these items may be spread through different rooms. The close range not only makes sure the traveller does not forget or lose track of these items, but also offers strong protection against thieves and pickpockets. The suitcase to be checked as baggage will be set to silent mode once it is checked and then awakened once the traveller is waiting for it at the baggage carousel so that it can be quickly located.

Once the tags are taught-in, the traveller can group them via a "checklist" or "reminder" function, a software function which can be taught-in at the original tag teach-in. The traveller can check the list each time one location is left for another, with each tagged object responding by any of the means discussed hereinabove when the user presses a button on the controller; a single press can trigger each object to respond in turn, to save time and effort. If an object in the group is not within the perimeter, the controller notifies the user that there was no response for that tag or the tag is beyond the distance set for the 'group'. The traveller can then use the controller to locate the object. Items may belong to more than one group, such as "Travel" or "Work," and have different settings for each group. For example, it may be acceptable for the cell phone to be a foot or two away from the user while on a restaurant table, but if the user moves three feet away, the tag can alerts the user, who always has the option of cancelling the simply accepting the alert. On the other hand, if the user is seated and the cell phone sends an alert, which means someone has removed the cell phone from the table, requiring quick action and, possibly, tracking. Thus, the user can work out a close distance, such as 2 feet, for all of the items in "Travel" and not have to reset them constantly; the user can simply ignore, acknowledge or cancel their warning. Ignoring is also useful if an object is only going to be out of one's possession briefly, as when a customs agent reviews a passport prior to stamping. Since alarms can be silent, there is no disruption to others and the protection can in effect be invisible.

People travelling together can also be tagged and grouped. Families and tour groups, for instance, have wristbands, chains or necklace holders with tags or tags affixed to clothing. These tags may be for one use only, with a much reduced battery lifetime, or belong to each family member (or group member) on a permanent basis. In either case, they are taught-in to a controller at the time they were set up and activated or when they joined a new group. For children, the distance perimeter and other features may be re-set often using the teach-in mode, depending on the activity, but there is also always the option of deciding on an appropriate distance and simply disregarding or cancelling alarms when the child's tag moves beyond the perimeter when the parent knows where the child is. The "stay together" mode is therefore the same for people as it is for objects the traveller wishes to keep within the set perimeter: the controller detects the departure of any tag-bearing person beyond that perimeter and alerts the traveller via a signal at the controller. The user can then press a button on the controller to verify that a tag has indeed strayed and call the child back or, if the child is not in sight, use the controller to seek and locate the child by following signals from the tag [0055], [0115].

In conjunction with an interne device, the traveller can also check in on a home system to observe what is going on there, check security, or scan the premises. The system does this with proximity check as described above.

Check-In:

At check-in, baggage for the cargo hold is still given a paper or coated tag by the carrier and the traveller receives a receipt; the difference is that now that issued baggage tag contains an embedded RFID tag. The RFID tags are inexpensive, especially in bulk and in view of the lives they can save and the property they protect from loss and theft. The carrier can now issue preconfigured or standard temporary tags. Preconfigured tags are specific for a given airport and flight, including destination and any additional information the carrier wishes to include. Preconfigured tags can still have information added at the counter by the representative, for example, an identifier by keyboard entry to identify the passenger, total number of baggage tags, and so on. Standard tags bear a simple identifier, such as an alphanumeric code which, when attached, is instantly "taught-in" a code for flight number and for international flights, a code for traveller ID, obtained when the passport is machine scanned. The process should add only seconds to the existing check-in procedures. The traveller also receives matching tags for each carry-on and embedded in the boarding pass itself. Since carriers regulate the number of checked items and carry-ons, tags can be acquired in a matched number set for these items and the boarding pass.

Carriers may choose not to disclose this security level to the public, but doing so has deterrence benefits. Since all tags use secure, unique packets that are useless if copied or intercepted, they are undetectable and will not interfere with travellers' personal tags, for example, or other RFID tags in the area. For flight security, during takeoff and landing, the user can press a single button to instruct all of his tags to remain in silent or standby mode.

Boarding and Loading:

Plane-side, at a pre-set proximity, a controller at the passenger boarding door and one at the cargo hold read the tags when they are within range. The plane-side controllers have received via computer or other secure transmission at least part of the ID for all tags meant for this specific flight; real time information can also be transmitted from the check-in counter or at the gate to instruct the controllers on how many tags are expected at each door, what their specific IDs are, and to which passenger they belong. The controller in effect does an inventory count to verify that each piece of checked luggage makes it into the hold and that no untagged items can get into the cargo hold; bags that have mistakenly come to the wrong flight will not match any other tag IDs for this flight. By the same token, a missing bag, one issued a tag but not yet read by the cargo hold controller, can be detected and located prior to take off by the controller function or by checking the system to learn whether the bag has simply turned up at the wrong plane. The alarm function ensures that no employee can intentionally or otherwise allow an untagged bag to get onboard, even one with a fake tag, i.e. visually looks the same but lacks the RFID tag and proper ID. Nor can tags be switched, because doing so inactivates the tag. After successful teach-in, the tag's "tampered with" function is active.

Subsequent tag attachment failure, damage, or disturbance, causing partial or complete separation of the tag from the object triggers an alarm.

At the passenger door, boarding passes and carry-ons are inventoried in the same way. An issued boarding pass that does not show up at the plane door prior to take off triggers a check by flight personnel, who use their controllers to determine whether any objects with that ID are in the cargo hold. Orphan or rogue bags can then be located in a matter of seconds with the controller and removed before the plane even starts up, which is a marked improvement over laborious hand searching and return to an airport when the missing passenger is detected only after takeoff. This is especially important on connecting flights, where a passenger may check in but fail to board for nefarious reasons. Even in cases where a passenger has simply not made the plane, due to sudden illness, for example, the baggage does not depart without its traveller, which is beneficial for the traveller. The boarding pass, if not the passenger, can be located by using a controller in the airport and/or using area tags. This information can be critical for tracking a person who has gone missing, for instance, or is a fugitive. Any boarding pass or object that does not authenticate to the scanner is culled from the group for further examination. Carry-ons without tags are also blocked from entry; all carry-ons should have been tagged at check-in or security; any which have not been tagged pose a risk and cannot be permitted to board.

Passenger, baggage and cargo screening occurs at journey's end, to verify that all luggage, cargo, passengers and their carry-ons have disembarked. At the baggage carousel, the traveller uses the controller to activate the tags on the checked baggage by pressing the wake-up button and waiting for the bag to respond or, if the baggage is too far away to be heard or the environment is too noisy, the controller responds to the user with a signal Alternatively the tag can be configured to execute the wake-up function once the tag detects that it is in range of the controller or in close proximity to the right carousel, which can be defined by an area tag above the carousel emitting a wireless signal. The issued carrier tags will offer a second validation. Given the ubiquitous black computer cases and suitcases, individuals need not struggle to read information on bags moving on the carousel. A controller at customs reads the carrier-issued tags and verifies that the traveller and all related tags on personal items match and are present. This is a second validation that is useful to prevent errors, theft, and unclaimed suspicious objects. For abandoned bags, security can scan the tag and link it to a specific traveller in a specific seat or, for international flights, passport information; a tag-less bag left in the controlled area, on the carousel or near the customs checkpoint, for example, constitutes an immediate emergency. Controllers can be used to search for the removed tag on the premises, in a trashcan, for instance, which could be then be examined to determine who originally was issued that tag. Because of the sophistication of the tags, a tag that is removed and placed on another object will indicate to its controller that it has been tampered with or the attachment seal has been broken; even then, the tag can still give other information to the controller about its original teach-in or set-up.

When a carrier is armed with RFID tags and controllers, routine but important tasks, like making sure that travellers and their luggage reach their connections and destinations together, are safer, easier and cheaper to perform. Because the tags are inexpensive, the carrier can let the tags leave with passengers and such special-use tags may be programmed to have a very short life span once activated.

Airport Employees:

Tags are integrated into ID badges, wrist bands, or any other attachable or wearable objects; they are also small and flexible enough to be integrated into a uniform, a piece of equipment, or a vehicle. Once in place, the tag can be tracked indoors or out, via a single controller or an array of area tags connected to a controller or system. More than one tag or tags with different capabilities can be placed in a single ID badge, depending on the tasks and areas where the employee works. The employer can put tags in workers' uniforms, equipment or vehicles. These tags are tracked by the area tags throughout the environment. In more complex variants, a perimeter can be established and complex tracking of people and materiel occurs, indoors or out, on a permanent or temporary basis. Controllers and tags are linked as arrays that communicate with each other and a central controller on the premises or in the area, as in a vehicle that moves along the baggage area, apron or runways. The tag communicates securely by RF signals with one of the controllers in possession of the user or with a system set up inside or around the premises. Communication with area tags around the premises is an indirect way to communicate with a controller, as the area tags in turn relay information from one to the next in defined slots. The controller sets the perimeter size or distance an item can be separated from other tagged objects or area tags. Monitoring can be programmed for a set time as well, so that the controller/tag check-in after set time periods or at regular time periods. In between intervals the tag's whereabouts may not matter, but the controller detects when it re-enters range and is accounted for as readily as when the tag leaves the perimeter. Depending on the configuration, the controller can log tag movements for data gathering purposes.

Another embodiment for security allows the tag to unlock a door, either through direct wireless contact to an integrated circuit in the lock or through an ambient system reporting that the tag, in this case embedded in an ID badge, is close to the door. This eliminates the need for keys, which can be lost, copied or stolen. The actual opening process is automatic for ID badges with tracking enabled or manual, via hitting a button. The tag also adds extra security to doors that already have traditional locks or number pads; even if an unauthorized person has a stolen key or learns the code, without the right tag in range the door does not unlock. For the basic use of opening a door automatically when the employee bearing the tag is in close proximity, and not tracking any other tag throughout a building, the ID badge requires simple tag functionality only.

Invisible gateways or portals can be created along corridors or wherever desired, and strengthened as needed with multiple tag/controller authorizations, including tags worn separately, e.g. in the name badge but also affixed to a uniform, so that all tags must be present for entry. Importantly, any tag or controller in the system can be remotely disabled, i.e. its signals will not be acknowledged by tags controlling doors or enabling use of equipment. Since ID badges normally travel home with a person, a badge that does not come in through its approved entrance or properly check in for timekeeping purposes, or simply goes missing, will not be allowed to function within the premises. An employee who calls in sick, for example, will be entered in the system as absent and that ID will not be activated at entrances for a defined time or until the employee returns and presents the ID at the proper entrance for reactivation, via an authorized person using a controller to notify the system. In this way, a stolen or "borrowed" ID cannot work on the premises when the employee in question is logged out. When employees require at least two tags, or an ID badge and a controller to have access, an ID badge alone would not work, enabled by the presence check of the present invention.

Since the tag transmits wirelessly (silently), workers may be kept unaware of all of its capabilities; an employee's whereabouts and movements can be monitored remotely without requiring staff to monitor check-in points or watch cameras. One reason to keep the information secret is to thwart attempts by thieves or terrorists who seek to forge ID badges. Similarly, an employee with authorization to enter only some areas who tries to go into another area is detected by area tags, which recognize the ID by part of its sequence as belonging to the system but reject the rest of the sequence. The system can also determine that one part of the "match" is missing, for example, a uniform tag but not the corresponding ID badge tag. The system has the flexibility to allow "layering" of security as needed, from general precautionary security to extremely high security. An ambient system of area tags, and the precise nature of the communication between tag and controller, allow the system to instantly "know" which tag is where and to log such information and/or transmit it through the system as a security alert. This (instantaneous) use is not limited to exits or other actual portals; area tags can establish any perimeter, indoors or out. Thus, the tags can be integrated into ambient security or create their own security system or be coupled with sensors to monitor sound, motion, heat, and other environmental factors.

Sensors can be connected to or integrated with the tag circuit. The tags can then communicate alerts on environmental conditions (heat or cold for example) or proximity conditions (motion, getting closer/not), and other factors for which sensors exist, such as humidity, oxygen levels, motion through a camera chip (CCD or CMOS), and strain/force. This alarm mode differs from other sensor systems in that the sensor does not have to hardwired into a security or other system or sit on a battery pack, dependent on human hearing/detection. Because the tag circuit has memory, it can also store sensor data which can be reported by request or at set intervals or times of day, or when set parameters are exceeded. A prompt alert can save a temperature-sensitive shipment, for instance, instead of merely indicating that at some point the temperature was exceeded. The tag can relay that information as it relays any other information, as a unique packet to its controller, or it can alarm on site by triggering loud alarms. This technique includes a filter function, only reporting out-of-range values based on the programmed range, if any. Such sensors provide a trigger only if a certain change is detected (auto-derivative or auto-delta or step-change). The sensors' triggers, e.g. solar or bend/deflexion/strain, is itself a sensor that can act as an energy-harvesting component to power up the circuit and charge the battery with the above-mentioned tuned circuit and diode.

Layering zones combined with embedded controllers and area tags for localization are particularly useful in highly secured areas. Area tags at portals can identify which tagged individuals and/or objects are entering and when, thus replacing sign in or time-keeping activities. Thus, the area tags create a perimeter and generate an alarm if the perimeter is crossed by any tagged object, either coming in to the covered area or leaving it. By using proximity detection to area tags, a tagged object can be tracked in the area with queries and responses from and to the area tags and, in turn, to the controller. Individual limits on specific tags are programmable. Similarly, the area tags, wired to sensors, can be part of an integrated ambient security system with fire, smoke, motion, temperature or other monitoring. Given memory in the area tags and the controller, logs can be maintained of events of interest. Since the controller can be a computer or other sophisticated device, the system can be live-monitored or transmit alarms only on certain conditions; and then by the various means previously described, including alarm in the area, silent alarm transmitted to specific individuals or other locations. Tags and contact sensors behind or attached to objects silently auto alarm and notify security if an object is (re)moved, as an improvement on the bottom bill in a bank teller or cashier drawer that prevents metal-to-metal contact and, when removed, triggers an alarm; tags in the bill wrappers can be tracked or trigger an additional alarm when the wrappers pass through a tag at the exit.

The system of area tags and controllers can operate independently under their own power or the system can be wired into the structure's power source and use its own batteries as backup in the event of power failure. Tags and controllers can have recharging capabilities, as with any electronic or electrical device integrated into an available power supply.

A controller also fits into an ID badge or other device. Operating as a controller, the badge keeps devices or other tags, including those on other workers, within range of the employee, so that no employee can leave the set perimeter, even as the controller badge moves throughout the building. At the same time, the badge is usable as an active RFID tag by switching between the modes when configured to do so or based upon wireless connections or connectivity to the system within the building. Thus, a large-zone or ambient controller is simultaneously read as a tag when it is part of a larger system.

In offices at the airport, tags in ID badges lock or unlock drawers or doors, preventing access unless the appropriate tag/controller is within a set proximity. The tag/controller platform is versatile, allowing a device to automatically unlock and operate a computer, for instance, and then cause the computer to become inoperable when the user moves a preset distance from it. The lock/unlock control can operate by contiguity plus period of time (continuous presence, e.g. 5 seconds), or an additional input from the user for extra security. In this embodiment, when the user moves out of the operating range of the computer, the tag, in the form of a switch, is actuated to turn the computer off or lock it until the tag returns. This mode of operation is also useful to those who have mobility, strength or dexterity problems; the user in this aspect readily actuates the tagged object with the controller or is automatically enabled upon proximity. Simple proximity and swipe cards can unlock doors, but they are expensive and cumbersome for smaller applications. They also usually only operate one item, for example, all employee cards can unlock the front door. The programmable controller can be linked to specific doors and devices for different levels of security. A locked filing cabinet, for example, will release the lock when the proper controller is within a close proximity for a set interval, such as 5 seconds. Therefore the apparatus is used as a proximity switch to actuate the tagged object.

In the office and in supply areas, the platform of tag/controller performs inventory in a scaled-up version of the simpler personal version with one controller and a few tags. As objects are purchased that will be subject to inventory, each is given a tag and entered into the employer's database via computer. Since many enterprises use computerized ordering systems, detailed information about the item purchased, its purpose and ultimate destination are included. This information, on a more complex scale than the personal groups, allows these objects to be cross-indexed by type of object (jump drive, computer) or by destination area (main office, conference room), date of purchase/addition to the system and so on, all linked to the tag's identifier. Once a new item is in place, area sensors can confirm its arrival and continued presence and/or alert security if the object leaves that area. Employers may have simpler systems that only monitor exits, for example; in that case, a controller can do "roll call" as it is moved throughout an area. The user can determine which groups of objects are to be checked, instead of staff having to physically locate each tagged object and then scan it in. If the range of the controller is problematic, for example, the number of jump drives per office is sought; the controller may pick up jump drives that are in offices next door. However, since the jump drives have been entered into the asset database, the software can detect duplicate readings; sort out jump drives by their assigned location and, with a display and connection to area tags, the controller can locate the tag in 3-dimensional space, if needed. Thus the scanner can inventory an entire office with all its contents or only one or more groups or categories of objects because these items were all scanned in when they were acquired and are groupable. Using the same object code, for example, as in a state or corporate ordering system, auditors can readily select their desired targets. Any tag on the pre-programmed list that does not respond to the controller's query is identified on the screen to the inventory taker. If the item has been removed and is elsewhere in the building, it will be found as the inventory continues. This inventory mode also counts how many tagged objects are present when that total is not known, as in a supply center. Roll call also works for specific personnel types or grades in an area are also inventoried by the same set-up when their numbers and locations are not known.

A controller or area tag with interface 140 fixed into an ambient system is always instantly available to count inventories as needed. If specific tagged items are sought, the controller employs the area tags to display this x-y-z information or forward it to a PC showing the scan on a screen. Tagged objects that are mobile or moved about the premises can also alarm when these items leave their set perimeters. Exit area tags add a final check to make certain that no tagged objects leave the premises. The inventory mode can be scaled up to allow real-time tracking of people, animals, material, and any tagged item while in transit and along the supply chain through warehouses, shipping, delivery and storage. Area tags and controllers can monitor an entire warehouse, cargo plane or convoy, and report loss or deviation to the individuals travelling with the items. The system can also hook into a backbone internet connection to improve the system's transparency e.g. by sending an email if tagged objects are moved in buildings.

The airport example demonstrates the versatility of the apparatus and exemplifies four functions: locating, tracking, controlling and recognizing tags. The structure and operation of the system as applied in this embodiment as described hereinabove would be equally applicable in any high security environment for tracking restricted records/equipment, or a shop that sells extremely valuable merchandise. Purchase of objects or authorization for their removal must be enabled by the controller/security system receiving a "permission" input. Valuable objects that are not normally moved or only moved with authorization, like artworks, weapons, or rare books, are also protected. In these situations, the tag need not be placed on the valuable object but instead is affixed to its place on the shelf; tags with close-range motion sensors detect even slight movements and generate an alarm to the controller or area tags that is acknowledged by security and acted upon. Alternatively, an attached tag and its controller can be set to a very small range. The small size of the tags makes them unobvious or even invisible to thieves, who can then be tracked. The theft of million dollar art works can be thwarted by well placed tags and controllers; even if a painting is cut from the frame, as typically happens, the instant the canvas separates from the frame, the capacitive switch will detect the change and a silent alarm, is relayed to a controller; and with a second tracking tag on the canvas, the object can be tracked.

In another embodiment, the system also operates on a temporary basis, with tags that are tracked through a museum, for example, where the tag's presence is detected at a given exhibit by an area tag or a fixed controller that then enables a narrative about the exhibit, allowing individuals to follow their own paths through these places instead of being restricted to a single path by a pre-programmed recording.

In another embodiment, the system operates in a hospital, nursing home or other institution where, in support of the mission to manage and care for individuals, security precautions and various clearances are required. Tag implementation for patients is integrated into the check-in process, with tags embedded in the plastic wrist bands printed out for each person on admission, much as in the airport example. Such institutions also generate a sheet of adhesive tags to be put on charts, patient orders, billing sheets, etc. at bedside and in other places as needed; these labels also can carry tags to enable matches between an order and a given patient ID. The RFID tags are small enough to be fitted onto a neonate's ankle and matched to the mother's wrist tag. To prevent kidnapping, area tags generate an alarm if a neonate is carried beyond a set perimeter. Mother and child can be verified as a match to make certain there are no swaps. Procedure verification and direct links to billing and records improve efficiency and comply with US HIPAA requirements for secure electronic medical record keeping. Coded information can be relayed by tags instead of being displayed on a door or at bedside, where it is not private, such as infection precautions, prisoner status, or other important restrictions, via data entered into the system by health care providers. Access to patient rooms, medications, records, and other protected areas can be managed by tags and controllers. Meals and medications can also be tagged to match a patient, since these must be labelled anyway. The wrist band tags are also useful to locate patients in a nursing home facility, for example, where individuals must be quickly detected and located if they pass through certain doorways or other perimeters defined by area tags. Another use is for controlled or dangerous medications. Tags on a bottle and cap signal an alarm to an area tag when they are separated, to track access; access can also be limited by programming the tag to allow access only during specific times. Prescription fraud would also be reduced with pads containing tags that are read at the pharmacy; no tag means the prescription is a photocopy or altered scan.

The use of the system to control objects can be applied to non-secure, ordinary activities of daily living when combined with sensors. Around the house lights turn on and off as the individual moves through the house, via motion sensors and area tags; the tags operate blinds, change channels on TV, open front doors and garage doors. If tag security is added to the use of keys, then the loss of keys does not mean the finder can use them successfully. Facilitating these activities is of special importance to individuals with impaired mobility, vision or other limitations. The controller does not require sophisticated dexterity, unlike a keyboard, and requires minimal strength or coordination to operate.

A central control unit also monitors an entire house and yard, for example, taking note of where children, pets, or tagged movable objects are; the system alerts when a tag moves beyond its particular taught-in limits—not allowed outside, not allowed beyond fence, not allowed upstairs, for example. The system offers protection by distance rather than protection via door or gate alarms—once the door alarm sounds, an individual has already escaped. Moreover, an individual who exits via a window, for instance, is not detected by a standard door alarm. The communication between controller and tag allows the tag to signal when it has moved wholly out of range or partially (out of configured distance but still in communication range) and/or by a configurable amount of time from last contact. Area tags can also report that a given tag is heading out of range or has gone silent.

The system also has a homing-in feature of benefit to users who are visually impaired or are in low-light conditions or otherwise cannot see the tagged object. For these situations, the tag has been taught-in to always respond with homing-in or only in emergencies, when the user presses the button or code to home-in. In this mode, a light or buzzer signal indicates that the controller is getting closer or further away from the object. It is also important in general emergencies, like a fire or hurricane, when it is vital to locate family members, pets, or important possessions, or for groups like scuba divers who are part of a guided tour, or in challenging environments, such as forests, smoke-filled areas, or boats.

Like car fobs and other security systems, the controller can have a "panic button," which when used at home, activates a call for help to any nearby controller or tag attached a network or PC to forward the call via telephone or to a neighbour or emergency service. "Panic" mode can also boost the controller to its maximum range, in seeking a child whose tag has indicated that it has gone beyond range. The panic button in a car or a place of work—in the ID badge, for example—could alert security in a building or parking lot. With the minimum requirement of one area tag or a fixed on site controller, an employee being robbed or abducted can send an alert that will notify authorities; if the tag is not obvious, it will also help an abducted individual be tracked immediately.

Another embodiment of this system is a find/rescue mode. In the "stay-together" mode, as described above, if a member of a group moves beyond the pre-set perimeter, whether a central controller at home or while travelling or camping, or in a fixed area with area tags (such as a playground), an alarm signal, as described above, goes to the group leader's controller or to a controller unit in a vehicle such as (for example) a school bus. Failure of any tag to respond to an auto proximity check package generates a retry signal and then the alert. At that point, the person operating the controller, which can be up to 2 km away from the area tag, can select the option of switching to a higher power level or to a lower data rate to reach farther.

In the particular case of children, a parent or other caretaker can place a tag on a child that is well concealed or disguised, so that a sexual predator, parental kidnapper in a custody dispute, or other threat would not know the tag is present and therefore could not remove it. In any case where a child has been taken or has wandered off, the first few hours after a child is taken are critical; a powerful directional antenna can be deployed, in a police car, for example, to seek the lost child and detect the tag, even if the child is within a structure. A wearable controller realized as a ring with fully integrated circuit can look disguised enough to look for the victim discreetly.

Variations and Modifications:

Teach-In:

In the simplest form, "teach-in" occurs in the following ways: when a new tag is to be linked to a controller The untaught tag beeps when it is attached to a surface of an object. The user then presses a button on the to-be-linked controller to accomplish teach-in.

Instead of pressing a button on the to-be-linked controller, the user can bring the controller close to the tag and allow a proximity detector in the controller to detect that this is the correct tag to teach-in.

Untaught tag(s) can be prompted by the user via the controller to emit a signal when the teach-in mode is to be activated. The user then:

attaches one or all of the tag(s) to target object(s), thereby accomplishing teach-in.

leaves tag(s) attached to target objects and accomplishes teach-in through proximity or button hit at target tag.

To preserve battery life, the teach-in notification and function times out after a set period if the user does not respond.

When a tag not in tracking mode, but previously taught-in, is removed from a target object, the tag goes into teach-in to await a new link confirmation. If no new controller confirmation received the tag keeps the current settings.

Advantages: The user knows, via feedback, that the tag is properly attached and that the tag and controller are in communication.

More Complex Teach-in Versions Allow Variations in Operation:

The system offers an additional step to accomplish teach-in. For this, confirmation of the pressing a button at the controller and tag is required. The attachment detection to the surface of an object can be replaced by pressing a button on the tag and disregarding the tag's attachment sensor. Advantage: This step adds a second confirmation of identifying the meant tag and avoids close proximity misdetection if many devices are around.

If the tag is set to emit an alarm at detachment, the tag does not go into teach-in mode until the user presses a button to "stop" or "accept" the alarm at linked controller. Advantage: This is a logical step to prevent stealing/removal of tags that are attached to alarm upon detachment.

Upon removal from the surface of the target object teach-out is not accomplished until the release button/sequence at the linked controller or a sequence (like a password) of button hits at the target tag is hit, latter used e.g. if the linked controller is not present. Advantage: for security purposes, the teach-in process cannot be carried out except by password or special signals.

For multiple tags: A single controller can manage multiple tags; the teach-in procedure is the same, except for the signalling to establish which tag is to be taught-in a given time. Advantage: Individuals commonly have more than one object to track; a controller needs a function that allows multiple tags to be taught-in in an orderly way, so that each tag gets taught in with its own parameters, type of alarm, allowable distances, and so on. The controller prompts the user via a signal to use the tag's teach-in button to identify the intended tag and its object. The teach-in can occur for each tag by bringing the controller and each tag into very close proximity to teach-in that particular tag. When a greater distance between controller and tags exists, to the intended untaught tag signals to the user that it is the one waiting for confirmation from the controller, and the user then presses that button. The user can also toggle through the tags within range by pressing a button, and then confirm the teach-in by pressing another button or bringing the controller and chosen tag close to each other. Teach-in buttons and capacitive switches at the tags keep their functionality.

Input Buttons:

During or right after teach-in, the tag's functionality is configured through the controller input interface, allowing the user to select the type of alarm, range, response, reaction time, and so on. Beyond the simplest embodiment, the controller input interface is by a series of buttons with, for example, a standard speaker symbol, a light symbol, "OK" or a check (✓), a clock symbol, and an "X" or reverse arrow, for example. Other button systems can use colors, letters, or a displayed menu. Input buttons can have more than one setting depending on the depth or strength of pressing the tactile switch. The program choices can be revised at any time, including the operating range, to any distance within or to the wireless range of the apparatus.

The input buttons are for all possible embodiments without buttons→simplest form of teach-in option 2 (proximity check replacing the button hit as confirmation);

The input buttons are for all embodiments with at least 1 button→all teach-in options above.

Advantage: The simplest form of a tag does not require buttons. To save time and effort, and increase flexibility of the system, a series of buttons on the controller allows the user to communicate quickly and take advantage of more options.

Housings:

The controller and tag can be housed in a finger ring, key ring, bracelet, necklace or other jewellery, an eye-glass temple bar, a key-fob, or a fob attached to the upper unused side of a key. The housing may be purely utilitarian in function, designed to fit in or attach to a plastic ID badge or article of clothing. A complete custom fabrication is also an option, including upscale materials or a disguise, for example, jewellery with gemstones.

Advantages: The main purpose of the housing is to make certain that the controller is always conveniently to hand; a secondary purpose is that it can be disguised or concealed, if a user desires this. Another purpose is to disguise the tag so it remains unobtrusive. The tag and controller are rugged, epoxy built, water resistant, shock resistant. The miniaturization and adaptability of the system allows variations such as building the entire system of a controller and a tag, for example, into a briefcase or a backpack.

User Input to a Controller:

The manual input(s) of at least one tactile switch or capacitive switch at the controller can be user configured to:
control different functions and
actuate different devices—e.g. open/shut garage door
perform an action for a group of devices
function like:
"accept"—a prompt from the controller to the user, for example, a signal representing an event or question to be confirmed
definitions from the user to other device(s):
"silent for a certain time" (currently signalling or being configured)
"remain silent until xyz device in wireless range
"shut down"
"silent"
"change mode"
"panic mode"

Advantages: The controller is more than a simple call/response system. It allows for complex instructions and responses, including using the controller/tag to actuate devices.

Capacitive switches next to each other, resulting in a "slider" 133 on the controller housing, can control the speed of actuation, e.g. speed of dimming a light or triggering a light response at the target devices to help the user identify the intended device. If more than one tagged device could be meant, the user toggles through the devices with the slider function (e.g. up and down) and waits for a predefined signal from the desired target device, then hits the "confirm" button to signal that "this" is the one. Advantages: Some responses are not simply "on/off" but require gradations, e.g. to dim a light; the slider is also an alternative to pushing buttons.

Distance Between Devices:

The longest link between a central control unit and a wearable controller or tag is approximately 2 kilometers. A tag and/or controller can switch to a higher power level or a lower data rate to reach this maximum range. The apparatus with its distance check (tracking/distance/proximity alert) is typically used at a range between 5 and 200 meters. Advantage: This range increases the utility of the system well beyond the normal uses of locating an object that is most likely in a room or office. The system can also boost itself as needed for greater ranges.

Homing In:

The frequency and/or pulse of the alert is used as a "homing device" so that the user receives feedback on how close the sought object is, instead of having the tag emit a steady beep or other indicator. The homing feature is also beneficial to users who are visually impaired, in low-light conditions, or cannot for other reasons see the tagged object. This feature can be used in emergencies, where it is vital to locate family members, pets, or important possessions, and in challenging environments, such as forests, smoke, or on a boat.

As the user is alerted that the predefined distance is exceeded, the signals (e.g. visual alert, the audible alert and/or the mechanical alert) have the capability of operating at an increased frequency correlated to the distance between the controller and the tagged object. The higher the frequency of the alert or the more frequent the alarm pulses, the closer the user is to that tagged object. Alternatively, when the frequency is set to lower, rather than higher, so the alarm pulses become less or more frequent as the tagged object is approached. The change in frequency alerts the user that the tagged object is further or closer.

Advantage: Homing in on a changing sound is faster and more efficient than listening for an intermittent beep, for example, and trying to figure out where the sound is coming from. The change in sound tells the searcher "warmer" or "colder" for the search progress.

Alerts:

Pressing a button or a combination of them enables the "set alarm response" mode and allows the user to toggle through these modes by pressing a button multiple times. A "mute" or "silent" mode set at the controller silences the assigned tags and/or controller, depending on the configuration. Other possible modes are:
Both alert (tag and controller)—acknowledged by a beep or signal on both sides
Tag generates alert—acknowledged by a beep or signal at the tag
Controller generates alert—acknowledged by a beep or signal at the controller "Silent" devices remain silent until re-enabled to signal. If a pre-configured circumstance is detected by a tag, e.g. crossing a boundary or distance perimeter that would be interpreted as leaving the tagged object behind, a silent wireless alert is sent and the alarm will be logged in the devices to be reported later.

Advantages: Alerts have variability in how they operate, including a "mute" mode. The user has flexibility in programming these alerts Functions of a Tag:

A tag integrated in an ID badge can act as a controller, if so configured, to allow workers access to secured areas. Normally, a tag meant to be tracked in buildings, for example, has a button used only for teach-in; the tag realized as an ID badge allows the tag button to be used to send a wireless request initiating a session with a controller. Advantage: The system has the versatility to function as an ID tag that can be tracked in real-time and can also communicate with controllers.

Tag as Switch:

The system allows a user to control objects via an interface input at the controller to on-switch or off-switch the tag's interface output ports. The controller's input buttons are programmable for the object's functions, to turn a device or function on/off/toggle/up/down/confirm/exit/lock/unlock. The system can be programmed so that lights are turned on and off as the user with a controller walks through a defined area, or doors lock behind the controller passing through; the controller can work here like a car remote, unlocking a door as the user approaches.

Advantage: In addition to locating objects, tags can also operate as switches and thus perform a variety of programmed useful actions without requiring that the user actually touch a light switch or door handle. This feature increases user safety, security of premises, and more independence for individuals with impaired hand function or mobility.

Controller:

A central control unit can be realized with a graphics display and as a USB stick. The USB stick contains all the required software to pop up upon insertion into a port. Combined with a higher gain antenna, this controller can reach farther than a wearable controller, for example. The user interface in this version may be a tactile or capacitive switch. Advantages: This controller has more options and more power. With display access, menus and images in 2 and 3 d, distance estimates, direction indicators and other capabilities are enabled. Additionally, the controllers can integrate into existing technology for simplification of use, convenience, and concealment.

Like a tag, a controller can also be integrated into:
a laptop
a cell phone/smart phone
a media player
a navigation system The integration into these devices is done by placing the miniaturized circuit physically into the housing and connecting the output ports of the controller to the serial or other compatible interface of the device.

Controllers embedded into any of these items allow for portability of the system in vehicles or other mode of conveyance, obviating the need for a portable controller or wearable controller. All setup, searching, and tracking can be done through the interface inputs and outputs of the devices. If attachable to a PC, all configuring can be done via the pop-up software once connected. The miniaturized circuit of a wearable controller integrated into a computer, e.g. on mainboard or in extension slot/interface, allows the computer to act as a central control unit, using the display of the computer screen instead of the portable version's display. The controller is configured by software that can be downloaded from a website or installed from other media.

A standard USB memory stick can be upgraded with the tag circuit. For the integration into USB drives and flash drives, the circuit controls the data lines of the drive and switches them through or open depending on proximity to other tags or controller or user input to the controller.

Tag Integration:

The circuit can be integrated into a USB drive, memory sticks of any kind known as flash drives, or a desktop or laptop computer. For the latter the interface 140 of the circuit can be connected to the bus system of the PC, e.g. serial, including USB, to allow various control functions from a controller's input buttons manually by the user or automatically, e.g. switch on/off or lock keyboard, depending on proximity. When integrated into a shielded/metal tower of a desktop computer an external antenna is required. The tag can be configured or teach-in confirmed through the computer keyboard. Data can be displayed on the monitor. The display can show the location of the tagged object to the user in the form of a graphical representation.

Advantages: Tags need not be stuck or attached to the outside surface of an object. Tags can be integrated into computers for teach in and to protect the computer by locking it when a controller is removed beyond the perimeter.

A controller and tag can be integrated into fixed infrastructures including a security control center and/or fire, heat, motion detectors, and other environmental sensors. The integration into a fixed existing infrastructure is accomplished by the physical implementation into the existing housings plus connecting the output ports of the tag to the bus system of the device, e.g. serial. Advantages: The controllers are integratable into fixed infrastructures; this process can easily and economically introduce various environmental sensors as well as using the existing hard structure for its own purposes of monitoring tags in the area.

Area Tags/Area Controllers:

In more complex variants, a perimeter can be established around an area via controllers acting as area tag, tags linked as arrays or area tags, which communicate with each other and report to a central controller on the premises or in the area, as in a vehicle. The area can be inside or out, permanent or temporary, and the controller can log tag movements for data gathering purposes.

Advantage: Flexible protection. Area tags can be used anywhere, indoors or out, to establish a perimeter and thus track, locate or perform other functions, including watching for breaches of the perimeter. They can attach to different surfaces and incorporate sensors.

Area Tag Modifications:

The size, form, components and teach-in of area tags are similar to the tag. Area tags can have integrated or attached sensors and output ports to fulfil one or a combination of these functions:

monitor other tags, embedded in ID badges, for instance, or on movable objects;

report/record attached sensors data, e.g. motion, light, temperature, pressure, strain;

manage devices, switch on/off light switches.

The area tags have the same basic circuit and a means of mechanical attachment as the tag attached to moveable objects. In this case, the area tag is secured to a structure, including a mobile one, like a vehicle, to monitor an area around this area tag, a hallway, room, area near exit, the teach-in procedure is executed as described for the tag. The area tags may also have attachment sensors 132 to verify they are properly attached and detect if they are damaged or coming loose.

Localization with Area Tags:

A series of area tags are placed:
in strategic positions
with strategic polarization and
with strategic corner arrangement to "cover" an area optimally for localization. "Strategically" and "optimally" mean in the transition region between near and far field, where the signal strength's deviation over distance is large, namely more than 20 dB per decade, the latter meaning that a change in signal strength is larger if distance is halved or doubled, larger than e.g. a change from interference by human motion. The large deviation of magnetic and electrical field of the wireless signal therefore overcomes the problems of reflections inside buildings, attenuation from water, and humans. At set-up area tags are placed at specific positions only as shown in FIG. 8; during setup the controller determines whether the position is "optimal" and sends a wireless message to the area tag, which then notifies the installer/user with predefined visual signals where the tags should be placed. The notification can also be emitted at a controller then including audible signals. The minimum distance between area tags is a main factor in the system's determination as to whether an area tag is well-positioned. Typically this distance is at least 1-10 meters.

Advantages: The tags/controllers are a unique but straightforward means of tracking activity within a designated area; when joined with sensors, they can report and log a variety of events, as selected by the user. This is a clear advantage over camera based systems, which require an observer, and whose records may only be reviewable after the fact, i.e. at tape change.

The array of area tags is synchronized to a controller or group of controllers in that area if localization or range extension is enabled. Area tags will not be queried with "Where are you?" since they are fixed in place; the area tag protocol is to remain in a sleep mode and reduce power consumption until it awakens itself periodically, as defined by a controller or based upon wireless signals, e.g. strength or traffic. Upon wake-up, the area tag is in a listening mode to determine the presence of an RF signal coming from the controller. Area tags use this packet to become precisely synced right before they send off their survey packet. Area tags can send their packet in parallel, so that the tag will receive at least one of these packets if in range of the covered area. Due to cancellation of parallel sent-off packets at specific locations, such a packet can only be received by a tag if area tags transmit on a slightly off-center frequency. For example, for a given data rate of 10 kbit/sec, the offset in a center frequency between two area tags, both signals coming to the tag with roughly the same signal strength, has to be at least 5 kHz to allow for a reception. For large enough differences in signal strengths coming from the area tags to a tag, the reception does not suffer from cancellation; the strongest will be received. If no controller packet is received for precise synchronization, the area tags will send their packet as earlier defined by the controller/system. If no range extension is enabled or the tag is not called by a controller, the area tag returns to a sleep mode for approximately 1-10 seconds to conserve power. If the user activates the search/find function at a controller, the area tags will be awakened upon their next wake-up and if there is no answer from a tag or the chosen tag, the controller can configure area tags to remain active in order to receive responses at a distance or to execute a search function from their position (area tags position) if defined to do so by the controller.

Advantages: A system can be set up to suit individual needs, in how and how often the tag wakes up, how it double-checks or rechecks an apparently problem, and how and when it searches.

Variation on Wireless Protocol Design:

This novel wireless presence check has other soft parameters that factor in the decision to send a wireless packet from the tag to the surveying controller. These include the defined operating time of the apparatus/system, the defined response time, the battery level, the application e.g. mute mode or traffic on the channel or within the system. Other decisions done by the tag during surveillance mode are:

Improper reception or packet not as expected: the tag sends back an alert packet or request for retransmission.

Signal strength measured by the tag is in a range nearing the defined edge or perimeter: the tag can respond with this range/signal strength data to notify the controller.

Failure to receive expected packet for x consecutive times in a row: switch to a different, farther-reaching data rate; the sequence and timing for this is known within the system. This method temporarily opens up possibilities to more than double the wireless range.

In a setup where a central control unit, not just a controller, is synced with area tags in an area where other mobile tagged objects are or will be present, the area tags detect tagged objects going out of transmission range. Then the area tags send that tag's information to the central control unit to report this event. The central control unit responds with an alert to all area tags to determine if any of them are in contact with the missing tag, for instance, the object has left one area, a room, and moved to another. The corresponding alert that the object has been found in another sector or has not been found at all is relayed to the controller and if setup enabled also to the user. The area tags can also monitor an outdoor area by establishing a perimeter on a temporary or permanent basis, as throughout a house and yard. If in tracking mode a tag has not responded for a configured time, the devices can switch to a higher power level or a lower data rate to reach farther. The threshold time to switch can be configured in the system.

Advantages: The central controller with area tags can permanently or temporarily monitor an area and track moving tags within that area. If any tags move out of range, the system can step up to try to find that tag; existing perimeter systems can report a breach, but have no means to track the individual or object that has left the perimeter.

A central control unit can be embodied as a high-range device for authorities and to reach lost devices. These devices can have directional antennae (e.g. Yagi antenna), or work together through the multiple controllers in police cars.

It should be appreciated that the various aspects and embodiments of the present invention as disclosed herein are merely illustrative of specific ways to make and use the invention and do not therefore limit the scope of the invention when taken into consideration with the appended claims and the following detailed description and the accompanying Figures. Features from one aspect and embodiment of the invention as disclosed herein can be combined with features from other aspects and embodiments of the invention.

Having thus described the present invention in detail, it is to be understood that the foregoing detailed description of the invention is not intended to limit the scope of the invention thereof. One of ordinary skill in the art would recognise other variants, modifications and alternatives in light of the foregoing discussion.

What is claimed is:

1. A RFID system, comprising:
   a controller including a transceiver circuit; and
   at least one RFID tag including a miniature circuit having a transceiver and a microcontroller, wherein
   the at least one RFID tag is configurable to operate in at least one of a tracking mode and a non-tracking mode,
   when the at least one RFID tag is configured to operate in the tracking mode, the microcontroller of the RFID tag is configured to conserve power usage by intermittently activating the miniature circuit to listen for a tracking signal from the controller and powering down the miniature circuit, such that the miniature circuit, when activated, transmits a response signal to the controller upon receiving and recognizing the tracking signal transmitted from the transceiver of the controller, and when the at least one RFID tag is configured to operate in the non-tracking mode, the transceiver of the RFID tag is configured to activate the microcontroller for a period in response to detecting a predetermined incoming signal sequence, and the microcontroller, when activated, operates to take a predetermined action based on a coded inquiry signal transmitted from the transceiver of the controller in response to the RFID tag receiving and confirming the coded inquiry signal, wherein when the RFID tag is in the tracking mode, the controller is configured to periodically transmit tracking data to the RFID tag at predetermined time intervals, the RFID tag is configured to receive the tracking data according to the periodic transmission by the controller at the predetermined time intervals, the RFID tag is further configured to generate expected data based on the received tracking data which the RFID tag will search for in the next tracking data received at a next periodic transmission by the controller, and the RFID tag is further configured to generate an answer signal to the controller in response to not receiving the expected data in the tracking data.

2. The RFID system according to claim 1, further comprising:
at least one area tag configured to intermediate communication between the controller and the at least one RFID tag, wherein the at least one area tag is fixedly located and includes a miniature circuit device that includes a transceiver and a microcontroller configured to intermittently awaken and power down the miniature circuit so as to conserve power usage, and
wherein the at least one area tag is further configured to transmit a coded inquiry signal detectable and recognizable by the at least one RFID tag such that the microcontroller of the at least one RFID tag takes action in response to a recognized inquiry signal from the at least one area tag.

3. The RFID system according to claim 1, wherein the controller is further configured to transmit a control signal detectable by the at least one RFID tag such that the at least one RFID tag operates in accordance with commands in the control signal.

4. The RFID system according to claim 1, wherein the at least one RFID tag is at least one of mounted in and integrated into a device to be attached to a subject to be tracked.

5. The RFID system according to claim 1, wherein the controller is at least one of mounted in and integrated into a device to be at least one of worn by and carried by the user.

6. The RFID system according to claim 5, wherein the device includes at least one of a cellular telephone, a pager, a key chain, a ring, a necklace, a bracelet, a watch, a bag, a purse, a luggage tag, a name tag and a belt.

7. The RFID system according to claim 1, further comprising a plurality of RFID tags.

8. The RFID system according to claim 1, further comprising:
at least one area tag configured to intermediate communication between the controller and the at least one RFID tag, wherein the at least one area tag is fixedly located and includes a miniature circuit device that includes a transceiver and a microcontroller configured to intermittently awaken and power down the miniature circuit so as to conserve power usage.

9. The RFID system according to claim 8, wherein the area tag further includes an environmental sensor to monitor environmental conditions local to the area tag.

10. The RFID system according to claim 9, wherein the area tag is further configured to output a signal in response to predetermined environmental conditions local to the area tag.

11. The RFID system according to claim 1, wherein the reply signal generated by the at least one RFID tag in response to the controller inquiry includes at least one of a visible, audible, tactile and electromagnetically detectable response.

12. The RFID system according to claim 1, wherein the controller is further configured to determine a distance between the controller and a RFID tag being queried based on a time delay in RF signals transmitted and received between the controller and the RFID tag being queried.

13. The RFID system according to claim 1, wherein the RFID tag further includes an attachment sensor to monitor whether the RFID tag is securely attached to an object to be monitored, and the microcontroller is configured to output a signal in response to the attachment sensor determining that the RFID has at least one of attached to the object to be monitored and detached from the object to be monitored.

14. The RFID system according to claim 1, wherein the RFID tag further includes an environmental sensor to monitor environmental conditions local to the RFID tag.

15. The RFID system according to claim 14, wherein the RFID tag is further configured to output a signal in response to predetermined environmental conditions local to the RFID tag.

16. The RFID system according to claim 1, wherein the RFID tag is further configured such that, while the RFID tag is in an awakened state, the at least one RFID tag at least one of remains silent and generates and outputs a reply signal in response to the recognized inquiry signal from the controller.

17. The RFID system according to claim 16, wherein the RFID tag is further configured to receive a predeterminedly recognizable inquiry signal during the awakened state such that, while the RFID tag is in the awakened state and if the RFID tag does not receive the predeterminedly recognizable inquiry signal during the awakened state, the RFID at least one of logs, counts, stores data, and signals to the controller or user upon reaching or exceeding a predefined limit.

18. The RFID system according to claim 1, wherein the tracking data includes at least one of a session key, an ID and an initial value used by the RFID tag to generate the expected data.

19. A method for operating a RFID system, wherein the system includes a controller; and at least one RFID tag including a miniature circuit having a transceiver and a microcontroller, the method comprising the steps of:
configuring the at least one RFID tag to operate in at least one of a tracking mode and a non-tracking mode;
transmitting via the controller a coded inquiry signal to the at least one RFID tag;
when the at least one RFID tag operates in the tracking mode, intermittently activating the miniature circuit to listen for a tracking signal from the controller and powering down the miniature circuit, and transmitting from the miniature circuit a response signal to the controller upon receiving and recognizing the tracking signal transmitted from the transceiver of the controller; and
when the at least one RFID tag operates in the non-tracking mode, activating the microcontroller for a period in response to detecting a predetermined incoming signal sequence, and operating the microcontroller to take a predetermined action based on a coded inquiry signal transmitted from the transceiver of the controller in response to the RFID tag receiving and confirming the coded inquiry signal, wherein in the tracking mode, in the step of transmitting via the controller a coded inquiry signal, transmitting via the controller tracking data in the coded inquiry signal to the RFID tag at predetermined time intervals; and in the step of operating the microcontroller to take a predetermined action based on the coded inquiry signal, receiving in the RFID tag the tracking data according to the periodic transmission by the controller at the predetermined time intervals, generating in the RFID tag expected data based on the received tracking data which the RFID tag will search for in the next tracking data received at a next periodic transmission by the controller, and generating by the RFID tag an answer signal to the controller in response to not receiving the expected data in the tracking data.

20. The method for operating a RFID system according to claim 19, wherein said step of the at least one RFID tag taking action in response to the recognized inquiry signal from the controller includes the at least one RFID tag at least one of remaining silent and signaling in response to the recognized inquiry signal from the controller.

21. The method for operating a RFID system according to claim 20, wherein said step of the at least one RFID tag taking action in response to the recognized inquiry signal from the controller further includes the RFID tag being configured to receive a predeterminedly recognizable inquiry signal during the awakened state, and while the RFID tag is in the awakened state and if the RFID tag does not receive the predeterminedly recognizable inquiry signal during the awakened state, the RFID tag signals so as to notify at least one of the controller and the user.

22. The method for operating a RFID system according to claim 19, further comprising the step of:

providing the at least one RFID tag so as to be at least one of mounted in and integrated into an object to be monitored.

23. The method for operating a RFID system according to claim 22, wherein the step of transmitting a coded inquiry signal to the at least one RFID tag further includes transmitting a control signal detectable by the at least one RFID tag such that the at least one RFID tag operates in accordance with commands in the control signal.

24. The method for operating a RFID system according to claim 19, wherein said step of the at least one RFID tag intermittently activating further includes providing the at least one RFID tag with an attachment sensor to monitor whether the RFID tag is attached to the object to be monitored, and the RFID tag signalling the user in response to the attachment sensor determining that the RFID tag has at least one of securely attached to and detached from the object to be monitored.

25. The method for operating a RFID system according to claim 19, further comprises:

providing at least one fixedly located area tag; and the area tag intermediating communication between the controller and the at least one RFID tag or a further controller.

26. The method for operating a RFID system according to claim 19, wherein the step of the at least one RFID tag generating the reply signal in response to the controller inquiry includes the at least one RFID tag generating at least one of a visible, audible, tactile and electromagnetically detectable response.

27. The method for operating a RFID system according to claim 19, further comprising the step of:

the controller determining a distance between the controller and the at least one RFID tag being queried based on a time delay in RF signals transmitted and received between the controller and the RFID tag being queried.

28. The method for operating a RFID system according to claim 19, wherein the step of the at least one RFID tag intermittently activating further includes providing the at least one RFID tag with an environmental sensor to monitor environmental conditions local to the RFID tag.

29. The method for operating a RFID system according to claim 28, wherein the RFID tag outputs a signal in response to predetermined environmental conditions local to the RFID tag.

30. The method for operating a RFID system according to claim 19, wherein the step of providing the at least one fixedly located area tag further includes providing an environmental sensor to monitor environmental conditions local to the area tag.

31. The method for operating a RFID system according to claim 30, wherein the area tag outputs a signal in response to predetermined environmental conditions local to the area tag.

32. The method for operating a RFID system according to claim 19, further comprising the steps of:

initializing the at least one RFID tag by activating the at least one RFID tag in a teach-in mode that identifies the at least one RFID tag to the controller; and storing the identification of the at least one RFID tag with the controller.

* * * * *